(12) United States Patent
Chen et al.

(10) Patent No.: US 6,996,306 B2
(45) Date of Patent: Feb. 7, 2006

(54) ELECTROSTATICALLY OPERATED MICRO-OPTICAL DEVICES AND METHOD FOR MANUFACTURING THEREOF

(75) Inventors: Chih-Chung Chen, Taipei (TW); Chengkuo Lee, Taipei (TW); Yen-Jyh Lai, Hsinchu (TW); Wen-Chih Chen, Yilan (TW); Ming-Hung Tsai, Sanchong (TW)

(73) Assignee: Asia Pacific Microsystems, Inc., Hsinchu (TW)

( * ) Notice: Subject to any disclaimer, the term of this patent is extended or adjusted under 35 U.S.C. 154(b) by 0 days.

(21) Appl. No.: 10/646,927

(22) Filed: Aug. 25, 2003

(65) Prior Publication Data

US 2005/0047721 A1 Mar. 3, 2005

(51) Int. Cl.
*G02B 6/26* (2006.01)
(52) U.S. Cl. .............................. 385/18; 385/25; 385/50
(58) Field of Classification Search ................. 385/18, 385/2, 8, 14, 15, 16, 25, 50, 52
See application file for complete search history.

(56) References Cited

U.S. PATENT DOCUMENTS

| | | | |
|---|---|---|---|
| 6,257,739 B1 * | 7/2001 | Sun et al. .................... | 362/285 |
| 6,827,866 B1 * | 12/2004 | Novotny ......................... | 216/2 |
| 6,836,584 B1 * | 12/2004 | Jerman et al. ................ | 385/18 |
| 2002/0118850 A1 * | 8/2002 | Yeh et al. ..................... | 381/313 |
| 2002/0146200 A1 * | 10/2002 | Kudrle et al. ................. | 385/18 |
| 2003/0183008 A1 * | 10/2003 | Bang et al. .............. | 73/514.01 |
| 2004/0060898 A1 * | 4/2004 | Tsai ............................... | 216/2 |
| 2004/0223204 A1 * | 11/2004 | Mao et al. ................... | 359/210 |

OTHER PUBLICATIONS

Marxer et al. Micro-opto-mechanical 2x2 switch for single-mode fiber based on plasma-etched silicon mirror and electrostatic actuation, Jan. 1999, Journal of lightwave technology, vol. 17, No. 1.*

Wilfried et al. Application of SOI-based optical MEMS, Jan. 2002, IEEE Journal on Selected Topics in Quantum Electronic, vol. 8, No. 1.*

Marxer et al. "A variable optical attenuator based on silicon micromechanics", Feb. 1999, IEEE Photonics technology letters, vol. 11, No. 2.*

Juan et al. "High-Aspect-Ratio Si vertical micromirror arrays for optical switching", Jun. 1998, Jurnal of Microelectromechanical systems, vol. 7, No. 2.*

* cited by examiner

*Primary Examiner*—Kaveh Kianni
(74) *Attorney, Agent, or Firm*—Troxell Law Office, PLLC

(57) ABSTRACT

Electrostatically operated micro-optical devices and method of manufacturing such devices is disclosed. In a preferred embodiment, the micro-optical devices using electrostatic comb drive actuators having new spring designs to overcome side instability and exhibit enlarged displacement, having new designs of comb finger electrode shapes to generate larger force output, and having new clip type latch mechanism to control the corresponding device at certain states in an analog manner without electrical power consumption. Based on the proposed optical path and device configurations, integration and assembly of a plurality of reflective micro-mirrors in conjunction with proposed new comb drive actuators is very promising way to provide micro-optical devices to get good optical performance and suitable for multi-channel applications. We also disclose several process techniques to manufacture the micro-optical devices with said electrostatic comb drive actuator in a mass production manner with higher yield.

18 Claims, 15 Drawing Sheets

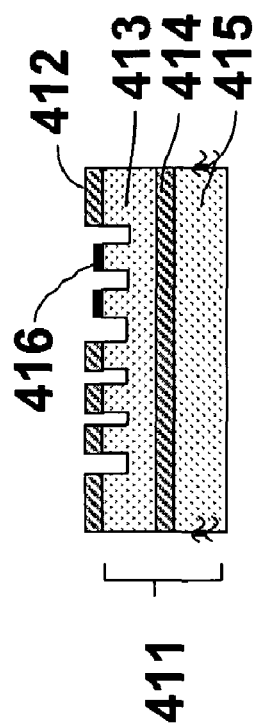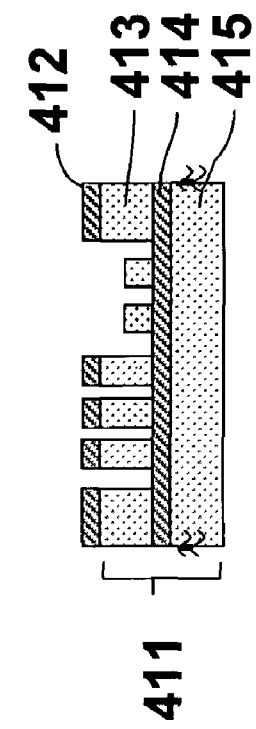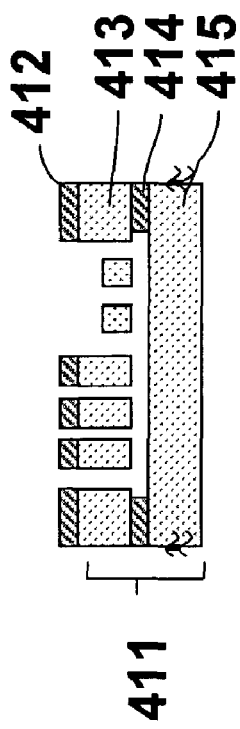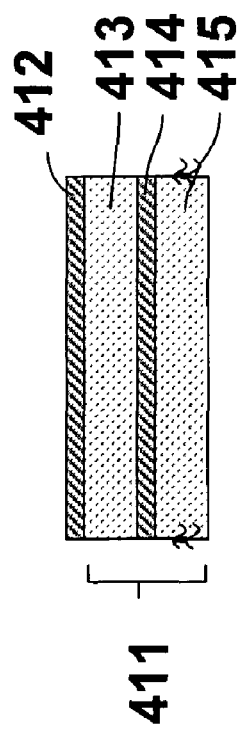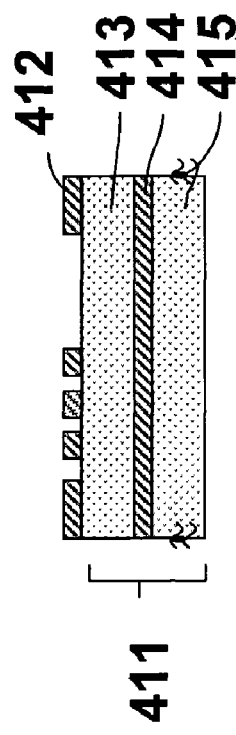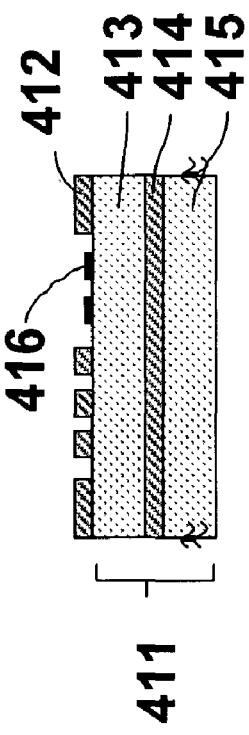

$$F = \frac{\varepsilon \cdot t \cdot H \cdot V^2}{2 \cdot g}$$

ε: dielectric constant
H: thickness of device
V: voltage
g: gap of finger
t: width of comb finger $$F = \varepsilon \cdot H \cdot V^2 \cdot \frac{(g \cdot \cos(\theta) + Wo \cdot \sin(\theta))}{(g - x \cdot \sin(\theta))^2}$$

ε: dielectric constant
H: thickness of device
V: voltage
g : gap of finger
Wo : overlap of comb finger
θ : degree of oblique comb
Lo : working distance

ELECTROSTATICALLY OPERATED MICRO-OPTICAL DEVICES AND METHOD FOR MANUFACTURING THEREOF

BACKGROUND OF THE INVENTION

1. Field of the Invention

This invention is related to electrostatically operated micro-optical devices and method of manufacturing such devices.

2. Description of the Prior Art

Considerable interest has recently been shown in optical microelectromechanical systems (optical MEMS) based on comb drives using an electrostatic actuation scheme. Combining the comb-drive actuator with the silicon-on-insulator (SOI) and deep-reactive-ion-etching (DRIE) process, many MEMS based components have been demonstrated such as optical switch, variable optical attenuator (VOA), and Fourier transform spectrometer (FTS), etc. It can be seen that, for example, W. Noell, et al., "Applications of SOI-Based Optical MEMS", IEEE J. on Selected Topics in Quantum Electronics, Vol. 8, No. 1, January/February 2002, pp. 148–154; C. Marxer, et al., "A Variable Optical Attenuator Based on Silicon Micromechanics", IEEE Photonics Technol. Lett., Vol. 11, No. 2, 1999, pp. 233–235; C. Marxer and N. F. de Rooij, "Micro-Opto-Mechanical 2×2 Switch for Single-Mode Fibers Based on Plasma-Etched Silicon Mirror and Electrostatic Actuation", IEEE J. of Lightwave Technology, vol. 17, No. 1, 1999, pp. 2–8; W.-H. Juan and S. W. Pang, "High-Aspect-Ratio Si Vertical Micromirror Arrays for Optical Switching", IEEE J. Microelectromechanical Systems Vol. 7, No. 2, 1998, pp. 207–213. Prior arts of U.S. Pat. No. 6,315,462, "Fiber Optic Circuit Switch and A Process for Its Production," O. Anthamatten and C. Marxer; and U.S. Pat. No. 6,229,640, "Microelectromechanical Optical Switch and Method of Manufacture Thereof," N. Zhang have described the utilization of DRIE and wet etching release process technologies to construct the optical switch devices from SOI wafer, or bonded silicon wafers. Such disclosed micro-optical devices comprise a high-aspect-ratio micro-mirror with vertical sidewall and an electrostatic comb drive actuator for controlling the position of micro-mirror. The common comb drive actuator includes a stationary comb finger electrode, and a movable comb finger electrode connected with the movable part, i.e., the micro-mirror in this case, via a suspended spring. This mentioned suspended spring is anchored on to substrate at one end. The electrostatic force for moving the micro-mirror can be generated by applying voltage to comb drive actuator. The restoration force generated by the deformed spring will pull the actuated micro-mirror returning to the initial position. Regarding to the application of optical switch, micro-mirror can be moved from the initial off-state (light transmission state) to the actuated on-state (light reflection state, i.e., switching) via applying voltage to comb drive actuator. On the other hand, the light attenuation range for VOA application is determined in terms of the in-plane position of Si micro-mirror, where this in-plane position is controlled via force balance between electrostatic force and spring force. Thereby it can control relative amount of attenuation by blocking part of light beams.

It is important for micro-optical devices like optical switch and VOA devices to be operated at low electrical power consumption in order to keep the overall power consumption of the whole optical network system as low as possible. As a result, the electrostatic actuation scheme offered by MEMS actuator shows no power consumption and is the best candidate for optical switch and VOA applications, because there no electrical current flows through electrodes. However, a continuously applied electrical load on MEMS actuator is necessary to hold the micromirror of optical switch staying at the on-state, because we need the force generated by MEMS actuator to balance the restoring force from spring. Therefore, mechanically-bistable mechanisms, i.e., latch mechanism, providing two relative positions that are both mechanically stable is desirable for optical switch to maintain at on-state without power consumption. Prior art of U.S. Pat. No. 6,303,885, "Bi-stable Micro Switch" B. P. Hichwa, C. Marxer, and M. Gale has disclosed a latched optical switch using buckled-beam with the arch-shaped leaf spring geometry driven by a bi-directional movable electrostatic comb actuator. Additionally, prior art of U.S. Pat. No. 6,549,107, "Latching Mechanism for MEMS Actuator and Method of Fabrication" M. Lim, R. Fan, and L. Que has disclosed the other kind of latch mechanism for optical switch has been realized by using gripper to clamp the switch at one position.

It is also important for micro-optical devices like optical switch and VOA devices to have low insertion loss, low polarization dependent loss, and low back reflection loss for practical applications. Combining the MEMS elements with micro-optics provides optical switch and VOA devices a free-space light path design approach. This is a key way to make the light beam coming from input fiber become collimated beam shape thereby to gain in better optical performances. The larger collimated beam size, from several tens to hundreds of micrometers, will make better optical performance, and make the acceptable alignment tolerance higher. However, it will also lead to a requirement that the corresponding MEMS actuator has to be able to provide enough displacement to let micromirror fully block or reflect the incoming light beam. In the conventional design of electrostatic comb-drive actuator, the maximum static displacement of comb actuator is limited by the side sticking effect of comb fingers. The tiny deviations of comb finger and gap width will cause the unbalanced force of both sides of finger electrode, and such deviation is easily induced by microfabrication process. The unbalanced force of both sides of finger electrode is the major contribution factor to the side sticking effect. How to design and make a comb drive actuator that is more robust to the process induced deviation and provides longer displacement is very attractive to industrial pratical uses. There are two fundamental approaches to realize a comb drive actuator with such capability, one is making the spring perpendicular to mirror moving direction as stiffer as possible, and the second one is making the force output of comb drive as higher as better.

The present invention provides micro-optical devices with electrostatic microactuator for optical switch and variable optical attenuator devices applications, and its relative manufacturing process techniques. According to aforementioned functional requirements for applications of optical switch and variable optical attenuator devices, the desirable design of an electrostatic microactuator should include large displacement, large force output, latch mechanism, design-in mechanisms to gain in better optical performance, and design-in processes and device structures to gain in better production yield, and so on. Therefore, die present invention discloses an electrostatic microactuator, and related structures and manufacturing processes especially emphasizing in fulfilling such design requirements.

SUMMARY OF THE INVENTION

The present invention has been made in view of the above micro-optical device function requirements, and it is an object of present invention to provide micro-optical devices using an electrostatic microactuator having new spring designs to overcome side instability and exhibit enlarged displacement, and to provide micro-optical devices using an electrostatic microactuator having new designs of comb finger electrode shapes to generate larger force output, and to provide a new optical light path design in conjunction with said electrostatic microactuator to render the made micro-optical devices exhibiting better optical performance, and to provide micro-optical devices using an electrostatic comb drive actuator having new latch mechanism to maintain the micro-optical device at particular state without additional electrical load on the electrostatic microactuator, and to provide process techniques to manufacture the micro-optical devices with said electrostatic microactuator in a mass production manner with higher yield.

The micro-optical devices according to the present invention comprise a set of movable comb finger electrodes connected with a movable suspended micro-mirror via a shuttle beam, a set of stationary comb finger electrodes, and a set of suspended springs. One end of this set of suspended springs is connected with the movable comb and micro-mirror through the shuttle beam, while the other end is connected with a fixed anchor regarding to the substrate. The force generated by electrostatic comb drive actuator upon various values of the applied voltage will bend the spring and induce displacement of said mirror and shuttle beam. The light attenuation is achieved in analog control manner regarding to mirror position via the force balance between bended spring and functioned comb drive actuator. Moreover, regarding to the case of buckled spring, the spring is arched toward on direction parallel along with the moving direction. The existing spring force exerts on shuttle beam to hold said mirror at one of the bi-stable state. The mirror and shuttle will start to move when the buckled spring being deflected into opposite direction with deflection equivalent to 133% initial buckled deflection due to the generated electrostatic force against to the existing buckled spring force. (The value of 133% could be found in the reference of US patent in application "2003/0029705A1") Thereafter, the mirror and shuttle beam will move to the other position of the bi-stable state. Combining with fiber optics, the micro-optical devices using electrostatic comb drive actuator and buckled spring can be operated as the optical switch devices.

In the preferred embodiments, the suspended spring beam of said micro-optical devices can be thinned by dry etching technology, therefore spring thickness in the perpendicular out-of-plane direction to substrate is thicker than the thickness of comb drive finger electrodes. As a result, the spring become soft in moving direction, and become stiffer in the perpendicular in-plane direction to the moving direction.

According to the invention, many ways can be provided to make said spring of said micro-optical device and its comb drive actuator to become compressive beam when said comb drive actuator start to move. Thereby the spring constant in the perpendicular in-plane direction to the moving direction will increase as the in-plane displacement increasing in moving direction. As a result, micro-optical devices using this kind of comb drive actuator are suitable for device designs and applications need large mirror displacement. These ways include but not limited to the following disclosed approaches: A comb drive actuator comprising four normal folded-beam springs in symmetric layout is disclosed in present invention; A comb drive actuator comprising four compressive folded-beam springs in symmetric layout is disclosed; A comb drive actuator comprising a pair of normal folded-beam springs and a pair of compressive folded-beam springs in symmetric layout is invented; A comb drive actuator comprising a pair of normal folded-beam springs with an U-shaped-bridge joint and a pair of compressive folded-beam springs located in a symmetric layout is invented too.

In other embodiments, the finger electrode shape of said comb drive actuator of said micro-optical device is a kind of shape with an oblique angle to enlarge the force output from said comb drive actuator, thereby the micro-optical devices using this kind of comb drive actuator are suitable for device designs and applications need large actuation force.

In accordance with other aspect of the present invention, an off-axis light path layout design enabling less coupled back-return-loss for said micro-optical devices is invented for analogically controlling the light attenuation.

In accordance with other aspect of the present invention, a clip type latch using friction force or electrostatic force mechanism is invented for said micro-optical devices to maintain the status of said micro-optical devices at certain condition without power consumption.

According to the present invention, many ways can be provided to make the mirror surface smoothness of said micro-optical devices in a mass production manner with higher production yield, including but not limited to applying the silicon etching solution to reduce the surface roughness; adopting the (110) oriented silicon substrate in conjunction with post-etching in the silicon etching solution; and oxidizing the mirror surface after the mirror side wall is formed.

According to the present invention, many ways can be provided to make the packaging process of said micro-optical devices in a mass production manner with higher production yield, including but not limited to lid capping on the substrate to protect the fragile MEMS elements; making flow channels and trenches on the substrate to avoid the movable and suspended MEMS elements being attacked by the sealing and assembling materials like glues, epoxy, solders, etc; and dicing the devices form substrates, then became discrete dies when the MEMS elements have been protected by lids.

The above and other objects, features and advantages of the present invention will become more apparent from the following detailed description taken in conjunction with the accompanying drawings, in which:

BRIEF DESCRIPTION OF THE DRAWINGS

FIG. 4a through 4f are the cross-sectional views of the micro-optical device comprising comb drive actuator with folded-beam springs with respect to the manufacturing procedure according to the present invention.

DETAILED DESCRIPTION OF THE PREFERRED EMBODIMENTS

The present invention flow will be described more fully hereinafter with reference to the accompanying drawings, in which preferred embodiments of the invention are shown. This invention may, however, be embodied in many different forms and should not be constructed as limited to the embodiments set forth herein; rather, these embodiments are provided so that this disclosure will be thorough and complete, and will fully convey the scope of the invention to those skilled in the art. Matched with corresponding drawings, the preferable embodiments of the invention are presented as following and hope they will benefit your esteemed reviewing committee members in reviewing this patent application favorably.

Figure 1:
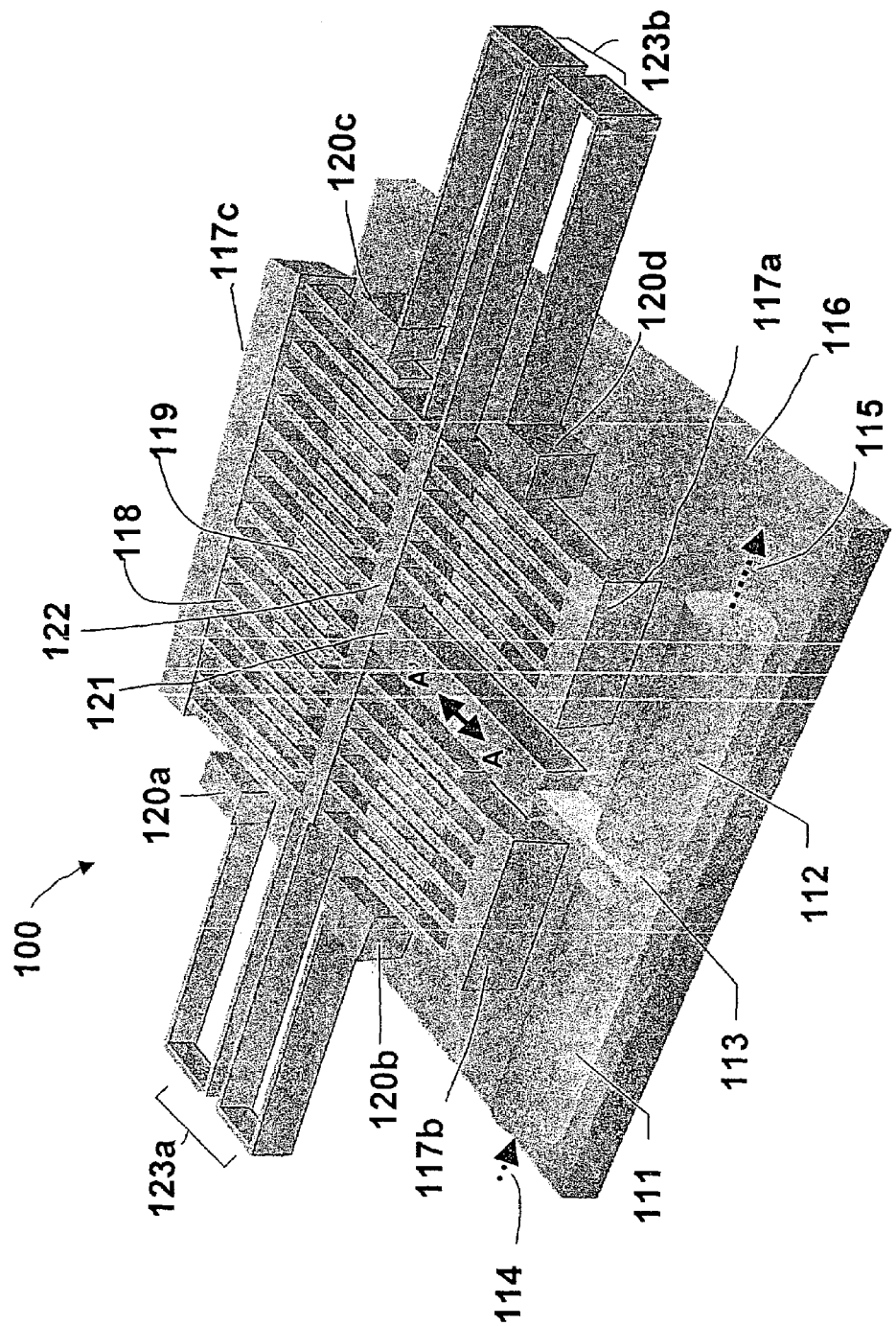
FIG. 1 is a schematic diagram of the micro-optical device comprising comb drive actuator with folded-beam springs in axial type variable optical attenuation configuration in accordance with the prior art.
Figure 2:
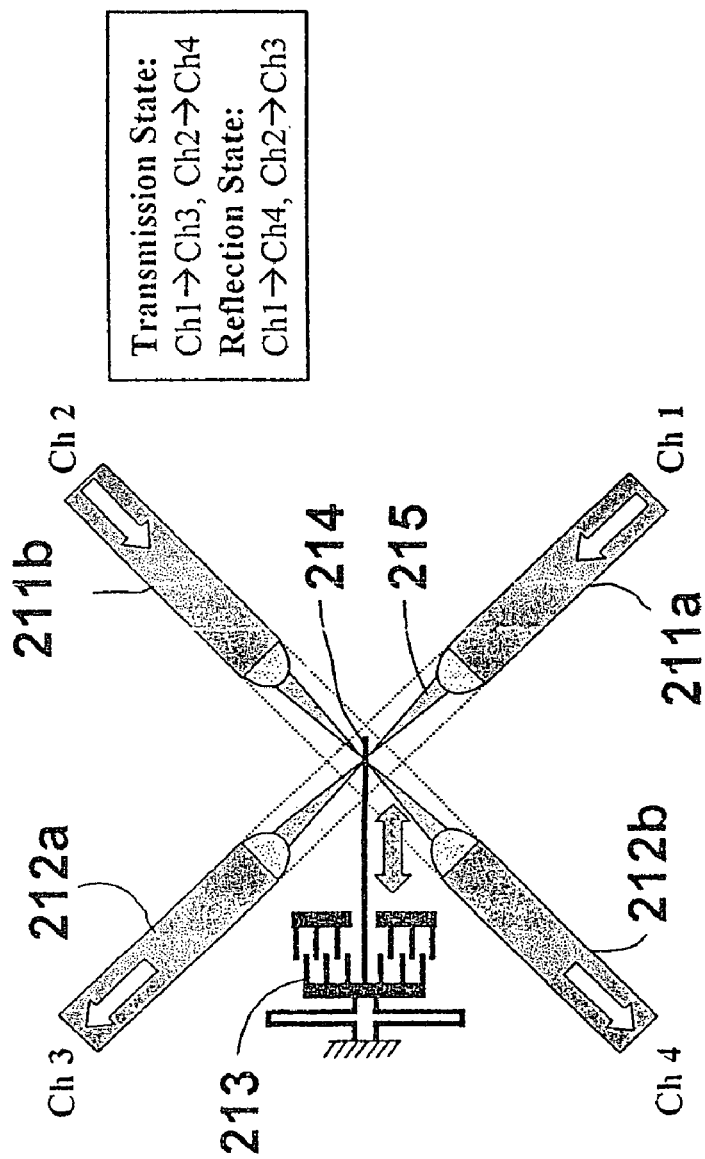
FIG. 2 is a schematic diagram of the micro-optical device comprising comb drive actuator with folded-beam springs in 2×2 optical switch configuration in accordance with the prior art.

Referring now to FIGS. 1 and 2, the simplified side view and top view drawings of a shutter type VOA and crossbar optical switch are disclosed by prior arts, see for example, W. Noell, et al., "Applications of SOI-Based Optical MEMS", IEEE J. on Selected Topics in Quantum Electronics, Vol. 8, No. 1, January/February 2002, pp. 148–154; C. Marxer, et al., "A Variable Optical Attenuator Based on Silicon Micromechanics", IEEE Photonics Technol. Lett., Vol. 11, No. 2, 1999, pp. 233–235; C. Marxer and N. F. de Rooij, "Micro-Opto-Mechanical 2×2 Switch for Single-Mode Fibers Based on Plasma-Etched Silicon Mirror and Electrostatic Actuation", IEEE J. of Lightwave Technology, vol. 17, No. 1, 1999, pp. 2–8; W. -H. Juan and S. W. Pang, "High-Aspect-Ratio Si Vertical Micromirror Arrays for Optical Switching", IEEE J. Microelectromechanical Systems Vol. 7, No. 2, 1998, pp. 207–213. These disclosed micro-optical devices for VOA and optical switch applications may be made in accordance with various known fabrication processes. In a particular process, the micro-optical devices 100 are made on substrates such as, the commercially available silicon-on-insulator (SOI) wafers. The SOI wafer includes a single crystal silicon device layer on a single crystal silicon handle wafer with a normally less than 2 micrometers thick SiO2 insulator layer. The micro-optical devices 100 comprise a reflective movable micro-mirror 113 on a shuttle beam 121, a set of suspended springs 123a, 123b connected with the shuttle beam 121 and anchored on to substrate 116 via anchors 120a–120d, a set of movable comb drive electrodes 122 that is connected with movable shuttle beam 121 and said suspended springs 123a, 123b move toward a set of stationary comb drive electrodes 117 a, b, c due to the electrostatic force between said two sets of comb drive electrodes when the electrical load is applied to the comb drive actuator, and a set of fiber optics 111, 112 for handling the input and output optical signals 114, 115, respectively. These features and microstructures of micro-optical devices 100 are formed in the device layer of SOI wafer via using the deep-reactive-ion-etching (DRIE) process, then a hydrofluoric acid (HF) etch process is used to remove the oxide underneath portions of the micro-optical device movable in relation to the base or substrate, such as the micro-mirror 113, shuttle beam 121, suspended springs 123a, 123b, movable comb drive electrodes 122, etc. Process induced feature size deviations may lead to the side instability regarding to the electrostatic force unbalance between electrode fingers 119 of movable comb drive electrodes 122 and electrode fingers 118 of stationary comb drive electrodes 117 a, b, c. The misalignment and improper treatment during the photolithography, and the side wall etching effect during the DRIE process may cause the phenomena of that comb feature size deviated from the designed and planed layout.

With respect to the operation of said micro-optical devices 100 for VOA application, the micro-mirror 113 located in between the spacing of transmission fiber 111 and reception fiber 112, and the light propagation path is along with the same axis of these two fibers i.e., the axial type configuration. The light is attenuated in terms of the percentage of transmission light beam being blocked by the micro-mirror 113 regarding to the position of micro-mirror 113. The position of micro-mirror 113 can be further adjusted by a comb drive actuator via shuttle beam 121. On the other hand, a crossbar optical switch can be formed in the same way and with the outlooks like the one shown in FIG. 1. The operation of said micro-optical devices 100 for crossbar optical switch application is depicted as the simplified drawing shown in FIG. 2. The micro-mirror 214 is located in the center of cross lines of light paths 215 of transmission fiber of channel one 211a to reception fiber of channel three 212a, and transmission fiber of channel two 211b to reception fiber of channel four 212b. According to the position of reflective micro-mirror 214 controlled by the comb drive actuator 213, the incoming optical signals from channel one 211a can transmit forward to the output channel three 212a, while the incoming optical signals from channel one 211b can transmit forward to the output channel three 212b, thereby said optical switch is operated at its transmission state. Moreover, the incoming optical signals from channel one 211a can transmit toward the micro-mirror 214 and being reflected forward to the output channel three 212b, while the incoming optical signals from channel one 211b can transmit toward the micro-mirror 214 and being reflected forward to the output channel three 212a, i.e., the switching state or reflection state.

The First Embodiment

Figure 3:
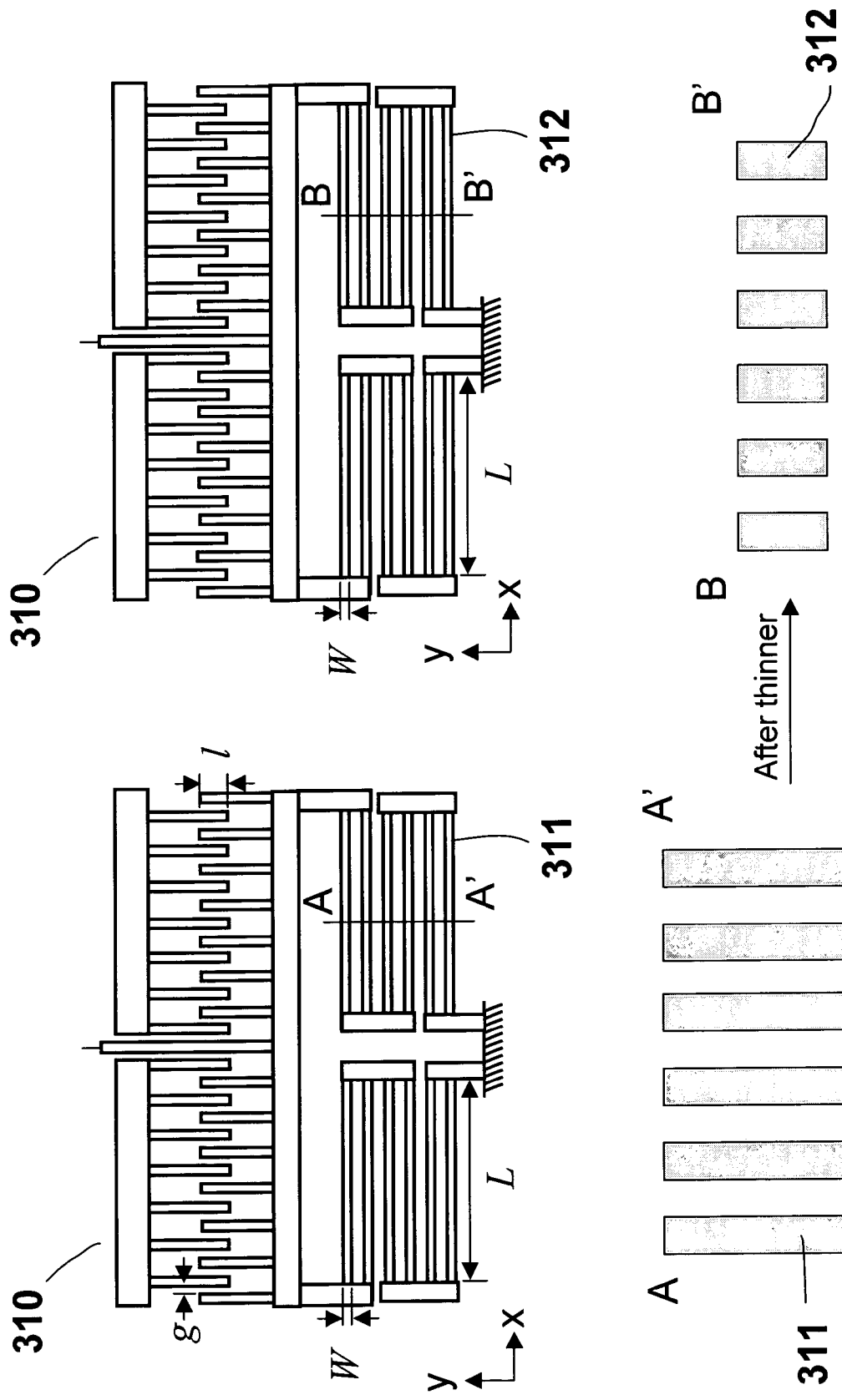
FIGS. 3a and 3b are the schematic diagrams of the micro-optical device comprising comb drive actuator with thinned springs of the present invention.

Again, due to the side instability issue, and requirement of longer traveling distance of micro-mirror 214, i.e., the displacement of comb drive actuator, we proposed a micro-optical device 310 using electrostatic comb drive actuators having thinned spring structure 312 as shown in FIG. 3. Let us go through the fundamental physics with respect to the mechanics of comb drive actuator. FIG. 3 shows the well-adopted comb drive actuator design with folded-beam spring 311. Such design has been reported to show increased displacement under the same actuation voltage comparing with traditional spring design, since the spring constant in and perpendicular to moving direction can become smaller and larger, respectively. (See for example, V. P. Jaecklin, C. Linder, N. F. de Rooij, and J. M. Moret, "Micromechanical Comb Actuators with Low Driving Voltage," J. Micromech. Microeng., Vol. 2, 1992, pp. 250–255; R. Legtenberg, A. W. Groeneveld, and M. Elwenspoek, "Comb-drive Actuators for Large Displacements," J. Micromech. Microeng., Vol. 6, 1996, pp. 320–329.) Therefore the maximum displacement of comb with folded-beam spring 311 can be increased without the side snapping effect of comb fingers when electrostatic force is larger than spring force. Comb drive actuator design is based on force equilibrium between electrostatic force and spring force, as shown in FIG. 3. Thus the static actuation displacement can be generally expressed as:

$$\Delta x = \frac{N \cdot \varepsilon \cdot t_e}{k_x \cdot g} \cdot V^2 \quad (1)$$

,where N is the number of comb electrode; $\varepsilon$ is the permittivity constant of air; $t_e$ is the comb electrode thickness; g is the comb electrode gap; V is the driving voltage; $k_x$ is spring constant in moving direction and denoted as x-direction; $\Delta x$ is the actuating displacement.

According to that the 2-folded beam spring can provide high stiffness ratio, i.e., the spring constant in lateral direction (defined as y-direction) over the spring constant in moving direction, most of comb-drive actuators adopt such 2-folded beam type of spring for various applications up to date. Each 2-folded beam is a combination of two clamped-guided beams, in the other words it consists of two sets of parallel cantilever beams in series, as shown in FIG. 3. In order to reduce the driving voltage demanded for large travel distance, a more flexible spring, i.e., 3-folded and 4-folded beam spring, is disclosed by present inventors in the literatures (Chihchung Chen, Chengkuo Lee, Yenjyh Lai, and Wen-Chih Chen, "Study of Lateral Comb Drive Actuator with Large Displacement and Low Actuation Voltage," Proc. of Microprocesses and Nanotechnology 2002, pp. 304–305, Tokyo, Japan, Nov. 6–8, 2002, IEEE Catalog No. 02EX589.; and Chihchung Chen, Chengkuo Lee, Yenjyh Lai, and Wen-Chill Chen, "Development and Application of Lateral Comb-drive Actuator," Jpn. J. Appl. Phys. Vol. 42, Part. 1, No. 6B, 2003, pp. 4059–4062) and has been disclosed by U.S. Pat. No. 6,315,462, "Fiber Optic Circuit Switch and A Process for Its Production," O. Anthamatten, and C. Marxer, Nov. 13, 2001. Similar to the 2-folded beam spring, this 3-folded or 4-folded beam spring consist of two clamped-guided beams and bended three-folds or four-folds. It means that each clamped-guided beam consists three serious parallel cantilever beams. Assume the spring constant in equation (2) and (3) of each cantilever beam is k. Thus the equivalent spring constant of 2-folded beam spring and 3-folded beam spring is equivalent to 2k and 4/3k, respectively, which can be derived from k and expressed as 2-folded spring constant $$k_x'' = 2k = \frac{2Et_sW^3}{L^3} \quad (2)$$

3-folded spring constant $$k_x''' = (4/3)k = \frac{4Et_sW^3}{3L^3} \quad (3)$$

, where E is the Young's modules, $t_s$ is the spring thickness; W is the beam width of a clamped-guided beam of a folded-beam spring; L is the folded spring beam length.

Hence, for the same displacement, driving voltage of 3-folded beam spring is smaller than the voltage of 2-folded beam spring, i.e., in the ratio of $\sqrt{2/3}$. Besides, according to eqs. (1)~(3), we may also realize that the comb drive displacement is in proportion to the ratio of $t_e/t_s$ under a fixed applied voltage. The ratio of $t_e/t_s$ means the thickness ratio of comb finger electrode to comb spring, where this ratio equals one in general case. However, it gives us a hint that displacement can be enlarged under the same applied voltage, if the spring thickness is thinner than comb electrode thickness. To the best knowledge of inventors', there is no reported data and literature about comb drive of stepped-structure between electrode finger and spring.

To make the folded-beam spring 311 become thinner as thinned folded-beam spring 312 shown in FIG. 3, we can apply the process shown in FIG. 4 to fabricate the micro-optical device 310 with thinned spring structure 312. After the first lithography step, $SiO_2$ hard mask 412 is patterned to be the shapes of the comb electrodes, shutter, and anchors on silicon device layer 413 of SOI wafer 411 (FIG. 4a~4b) wherein the SOI wafer 411 includes an isolation $SiO_2$ layer 414 embedded between a device layer 413 and a handle wafer 415. The photo resist (PR) mask 416 is defined thereafter to be the shape of folded-beam spring (FIG. 4c). By using deep reactive ion etching (DRIE) to etch this SOI wafer with said $SiO_2$ hard mask 412 and photo resist mask 416 on surface, the PR mask will be fully etched away after silicon of no mask area being etched down to certain depth. Then the area of folded-beam spring begins to be etched. Since the Si/PR etching selectivity is approximately 10~40 during typical DRIE process. The DRIE process is done when the insulation $SiO_2$ layer underneath the silicon device layer is reached during the etching process (FIG. 4e). The movable comb fingers, shutter, and suspended thinned spring are eventually released by using HF wet etching to remove the insulation $SiO_2$ layer 414 underneath the relative area (FIG. 4f). A step height between folded-beam spring and comb finger electrodes can be made to form a micro-optical device 310 with stepped structures.

Figure 5:
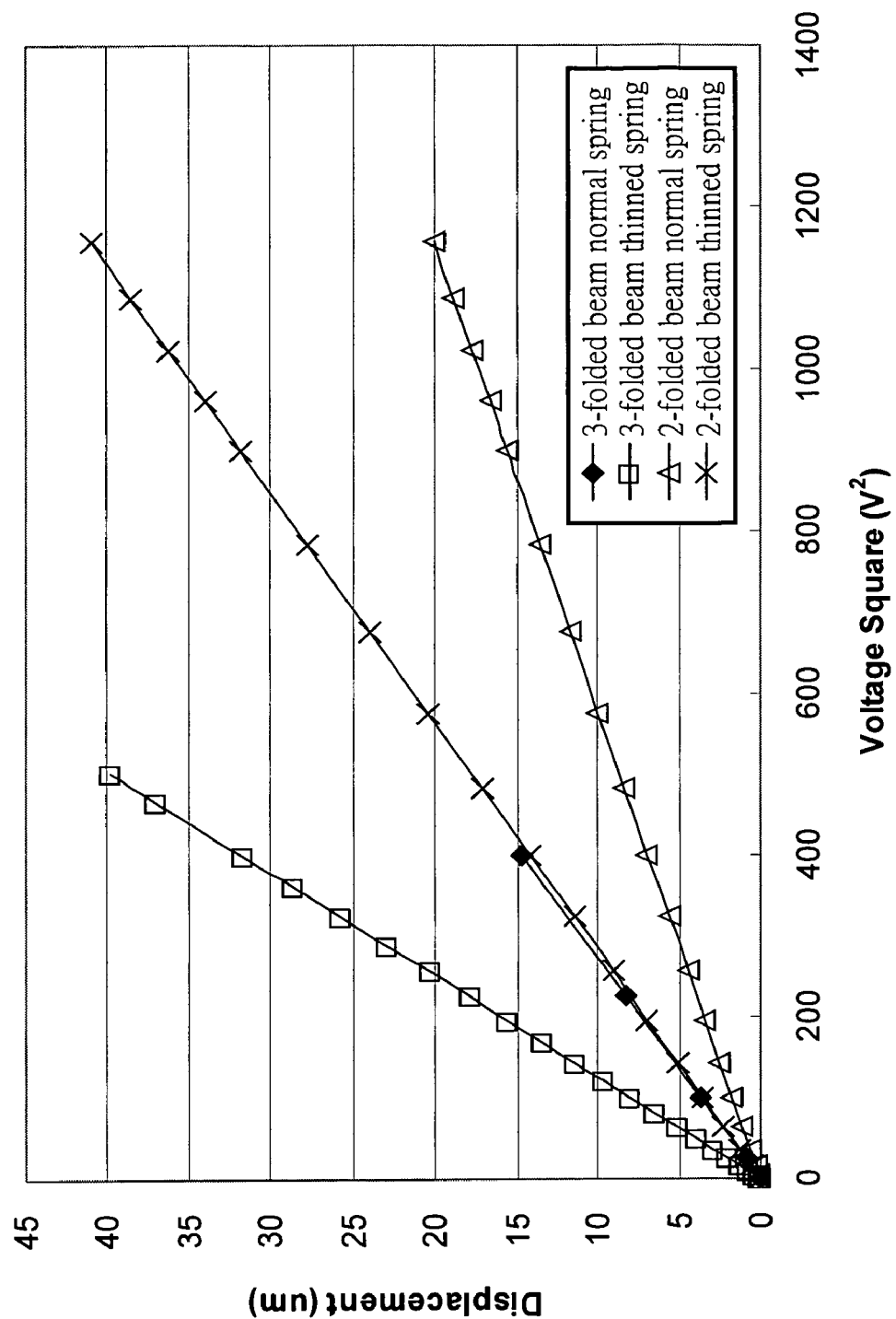
FIG. 5 shows the measured and simulated results of displacement vs. applied voltage for a comb drive actuator with two- and three-folded normal springs, and thinned springs of the present invention.

To further explain and prove our invention, we made comb drives of 4 types of springs, they were comb drives of 3-folded normal spring, 3-folded thinned spring, 2-folded normal spring, and 2-folded thinned spring. The related geometric parameters of these springs are spring length of 800 mm, spring width of 2.3 mm, spring thickness of 92 mm, comb finger gap of 4 mm, comb finger number of 100, comb finger overlap of 20 mm, and comb finger thickness of 45 mm. Comparing measured data with the simulated curves of displacement versus square of applied voltage as shown in FIG. 5, the 3-folded thinned spring comb drive can be actuated by a relatively lowest driving voltage. This result points out that the comb drive of 3-folded thinned spring exhibits the best-optimized performance, i.e., the larger displacement under the same applied voltage, and the longest displacement without happening side sticking of comb finger electrodes. It proved our invention may lead to comb drive actuators have higher stiffness in perpendicular direction, i.e., the y-direction, to moving direction and lower spring force in the moving direction i.e., the x-direction. Without making springs of longer length, it means larger occupation area and lower process yield, we can have voltage reduction by just making the spring thinner. Beside, according to present process design, this thinned spring structure is defined and patterned by one mask only. It means no physical parameter deviation occurred due to the process, like misalignment induced variation of spring width, etc. The above experimental results have been disclosed by inventors in these papers (Chihchung Chen, Chengkuo Lee, Yenjyh Lai, and Wen-Chih Chen, "Study of Lateral Comb Drive Actuator with Large Displacement and Low Actuation Voltage," *Proc. of Microprocesses and Nanotechnology* 2002, pp. 304–305, Tokyo, Japan, Nov. 6–8, 2002, IEEE Catalog No. 02EX589.; and Chihchung Chen, Chengkuo Lee, Yenjyh Lai, and Wen-Chih Chen, "Development and Application of Lateral Comb-drive Actuator," Jpn. J. Appl. Phys. Vol. 42, Part. 1, No. 6B, 2003, pp. 4059–4062).

The Second Embodiment

Figure 6:
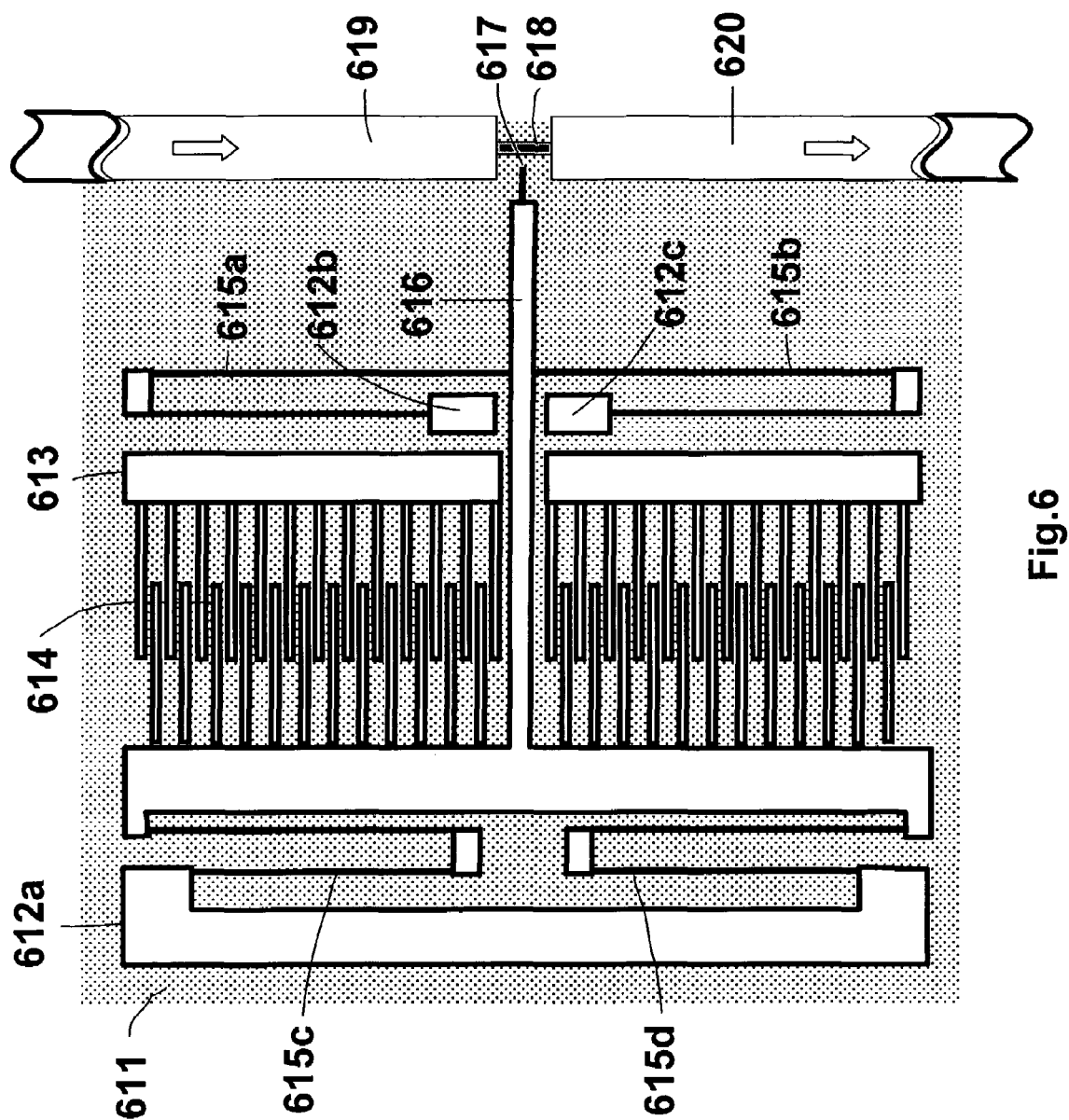
FIG. 6 is the top view of the micro-optical device comprising comb drive actuator with symmetric normal folded-beam springs of the present invention.

According to another aspect of our invention, the micro-optical devices 100 shown in FIG. 1 or micro-optical devices 310 shown in FIG. 3 can be modified into the layout configuration shown in FIG. 6. To further reduce the instability influence from the moment contributed by the lateral electrostatic force of comb electrodes, all the spring anchors are assigned symmetrically at both sides of comb electrodes. By using such symmetric layout in conjunction with our spring thinning approach, we are able to make the comb drive actuator exhibit enlarged displacement and robustness to instability.

The micro-optical device 611 that is disclosed in the present invention as shown in FIG. 6 comprises a reflective mirror 617 on one side of a shuttle beam 616, a set of suspended springs 615a, 615b which supports the shuttle beam 616 at their free ends and fixed onto a substrate via anchors 612b, 612c, a set of movable comb drive electrodes 614 that is connected with said shuttle beam 616 on one side and a set of suspended springs 615c, 615d on the other side, and a set of stationary comb drive electrodes 613. The shuttle beam 616 is arranged at the center of whole device structure and free-standing supported by four suspended symmetric normal folded-beam springs 615a, 615b, 615c, and 615d, where these four springs are symmetric allocated on both sides of comb drive electrodes 613, 614, and suspended springs 615c and 615d are fixed onto the substrate via rigid anchor structure 612a. These symmetric normal folded-beam springs may also denote as the symmetric parallel springs. The set of stationary comb drive electrodes 613 is electrically isolated from all the rest parts of micro-optical device 611, e.g. the set of movable comb drive electrodes 614. When electrical voltage bias is applied across the comb drive electrodes 613 and 614, the generated electrostatic force will drive the comb drive electrodes 614 and the whole movable part of micro-optical device 611 toward the stationary comb drive electrodes 613. When we apply said micro-optical device 611 in optical MEMS applications, a straight line light oath 618 formed by an incoming light from an input optical fiber 619 to a reception optical fiber 620 and a shutter type mirror of said mirror 617 will compose a typical device configuration for gate type optical switches and variable optical attenuators. Thus the position of said mirror 617 will be away from its rest position, when an electrical voltage is applied between comb drive electrodes 613 and 614. According to different spatial position of mirror 617 and light path 618 with respect to different applied voltages, the intensity of light in transmission will vary away from the original incoming light intensity. More importantly, we can deploy the technology disclosed in the first embodiment regarding to FIG. 3 and FIG. 4 to prepare a micro-optical device 611 with said symmetric normal folded-beam springs 615a, 615b, 615c and 615d thinner than the comb drive electrodes 613 and 614 in the perpendicular direction to substrate. Therefore the spring stiffness becomes higher in the planar direction along with the direction perpendicular to shuttle beam 616 moving direction.

On the other hand, several prior arts have disclosed a factor that spring constant of the suspended spring in the y-direction of comb drive actuator will be increased along with the increased displacement in the x-direction when this spring become compressive state along with the y-direction at the beginning, i.e., no displacement state, or no actuation state. (See for example, U.S. Pat. No. 5,998,906, "Electrostatic Microactuator and Method for Use Thereof," John H. Jerman, John D. Grade, and Joseph D. Drake, Dec. 7, 1999; Guangya Zhou and Philip Dowd, "Tilted Folded-beam Suspension for Extending The Stable Travel Range of Comb-drive Actuators," Journal of Micromech. and Microeng. Vol. 13, 2003, pp. 178–183; "Design of Large Deflection Electrostatic Actuator," Journal of Microelectromechanical Systems Vol. 12, No. 3, 2003, pp. 335–343.) Thus the compressive spring can maintain higher stiffness in the y-direction than the conventional normal spring; that is, the maximum displacement in x-direction can be enlarged by utilizing the compressive spring instead. In order to further explain the details of our present inventions, we make the definitions and background explanations of parameters regarding to mechanics of comb drive actuator first. As shown in FIG. 3, it explains the simplified relation between movable and stationary combs. When a driving voltage is applied across the comb set, the electrostatic force along the moving direction (x-direction) is defined as:

$$F_{ex} = \frac{N \cdot \varepsilon \cdot t_e}{g} \cdot V^2 \qquad (4)$$

where N is the number of comb electrode lingers; $\in$ is the permittivity constant of air; $t_e$ is the comb electrode thickness; g is the comb electrode gap; V is the driving voltage. Besides, the static actuation displacement is generally defined by equation 1. While the electrostatic force along the in-plane direction perpendicular to moving direction (y-direction) is given by:

$$F_{ey} = \frac{N \cdot \varepsilon \cdot t_e \cdot l}{2 \cdot (g-y)^2} \cdot V^2 - \frac{N \cdot \varepsilon \cdot t_e \cdot l}{2 \cdot (g+y)^2} \cdot V^2 \quad (5)$$

where l is the initial overlap of the comb electrodes of two sides, and y is the shift distance of movable comb finger from central axis between two stationary comb fingers. We further interpret the stability criteria of equivalent spring constant in y-direction, i.e., $k_{ey}$, by considering the deviation Δ in y direction shown in FIG. 3 as:

$$k_{ey} = \left.\frac{\partial F_{ey}}{\partial y}\right|_{y=\Delta} = N \cdot \varepsilon \cdot t_e \cdot l \cdot V^2 \cdot \alpha \quad (6)$$

$$\alpha = \left(\frac{1}{(g-\Delta)^3} + \frac{1}{(g+\Delta)^3}\right) \quad (7)$$

where Δ is the variation tolerance of movable comb finger in y-direction. According to our experiment, the variation tolerance is mainly dominated by the process variation. If $k_y$ is larger than $k_{ey}$, then the comb can be operated without any side sticking influence; The movable comb fingers will become instable in y-direction when $k_y$ is less than $k_{ey}$. Therefore, the maximum stable traveling distance $\Delta x_{max}$ appears when $k_y$ is equal to $k_{ey}$, and can also be derived as:

$$\Delta_{x_{max}} = -\frac{L_0}{2} + \sqrt{\frac{L_0^2}{4} + \frac{1}{g \cdot \alpha} \cdot \frac{k_y}{k_x}} \quad (8)$$

Obviously the maximum traveling distance will be increased, when $k_x$ is decreased and/or $k_y$ is increased. The $k_y$ of conventional comb-drive design, i.e., using the normal folded-beam flexure spring, is decreasing as the actuated displacement increasing, in the mean time the $k_e$ sustains approximately constants At this situation, the maximum traveling distance is constrained by the side instability effect.

Figure 7:
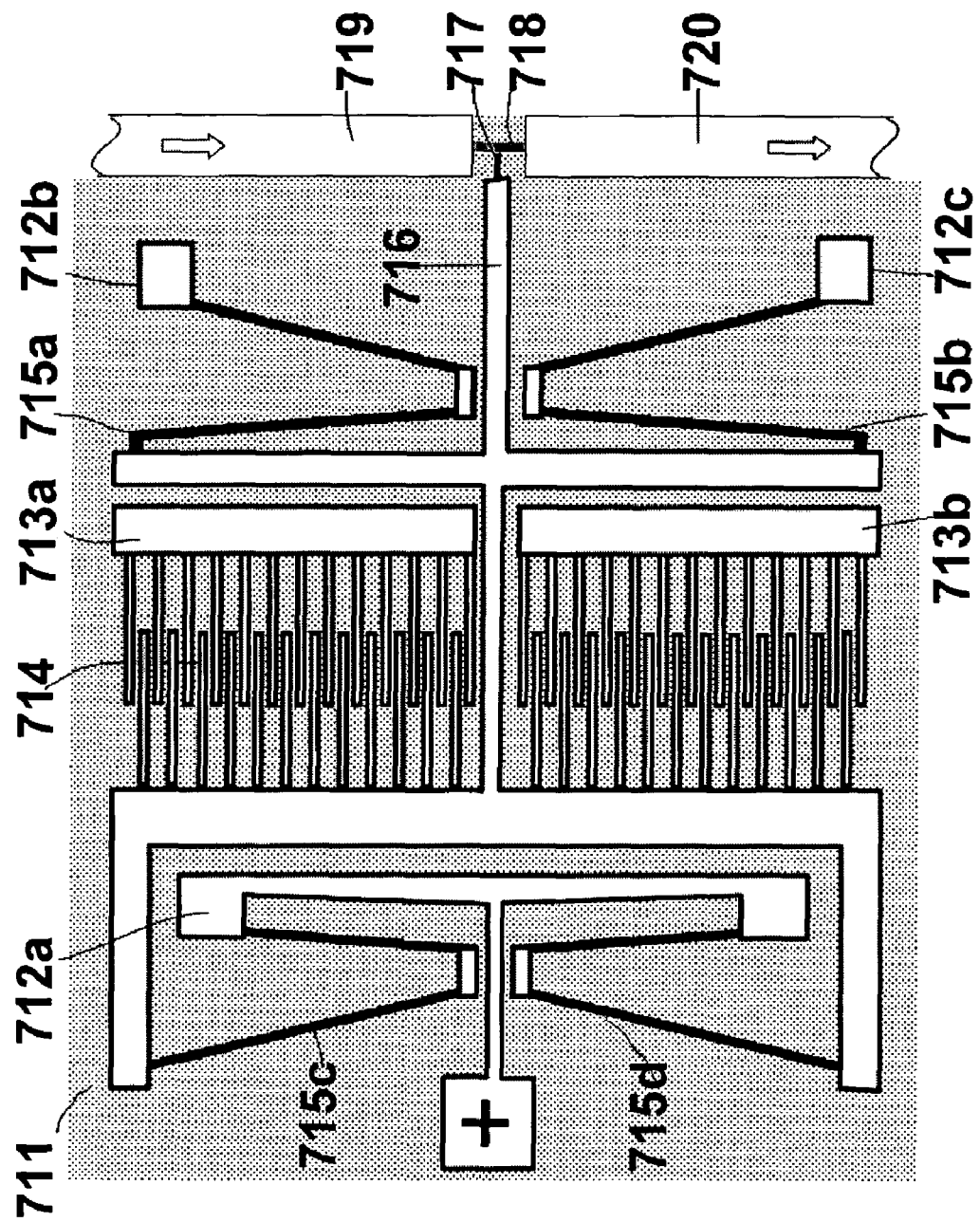
FIG. 7 is the top view of the micro-optical device comprising comb drive actuator with symmetric compressive folded-beam springs of the present invention.

With the background understanding, in order to compare the difference regarding to compressive and normal springs, we propose three new designs of comb drive actuators. Similar to the symmetric normal folded-beam springs 615a, 615b, 615c and 615d on both sides as shown in FIG. 6, we design new comb drives with symmetric compressive folded-beam springs 715a, 715b, 715c and 715d on both sides, as shown in FIG. 7, and new comb drives with asymmetric folded-beam springs 815a, 815b, 816a and 816b on both sides, where one is the compressive spring (815a and 815b) and the other is the normal spring (816a and 816b), as shown in FIG. 8a.

The symmetric compressive folded-beam springs also denote as symmetric compressive springs, while the asymmetric folded-beam springs denote as asymmetric hybrid springs too. Except to the replacement of suspended springs from the format of 615a, 615b, 615c and 615d in FIG. 6 to the format of 715a, 715b, 715c and 715d in FIG. 7, all the rest structures and elements in the micro-optical device 711 as shown in FIG. 7 represent identical functions as the structures and elements explained in FIG. 6. As a result, the micro-optical device 711 comprises a reflective mirror 717 on one side of a shuttle beam 716, a set of stationary comb drive electrodes 713a and 713b, a set of movable comb electrodes 714, and four suspended symmetric compressive folded-beam springs 715a, 715b, 715c and 715d. The suspended compressive folded-beam springs 715a, 715b are connected with shuttle beam 716 and anchored onto the substrate via anchors 712b and 712c.

The rest part of suspended compressive folded-beam springs 715c and 715d are connected with shuttle beam 716 via a set of movable comb drive electrodes 714, and springs 715c and 715d are fixed onto the substrate via anchor 712a. The light signals from input optical fiber 719 transmit to reception optical fiber 720 so as to form a light path 718. As we disclosed in previous paragraphs regarding to FIG. 6, the micro-optical device 711 can perform the gate switch and light attenuation functions in conjunction with light path arrangement as shown in FIG. 7.

Figure 8A:
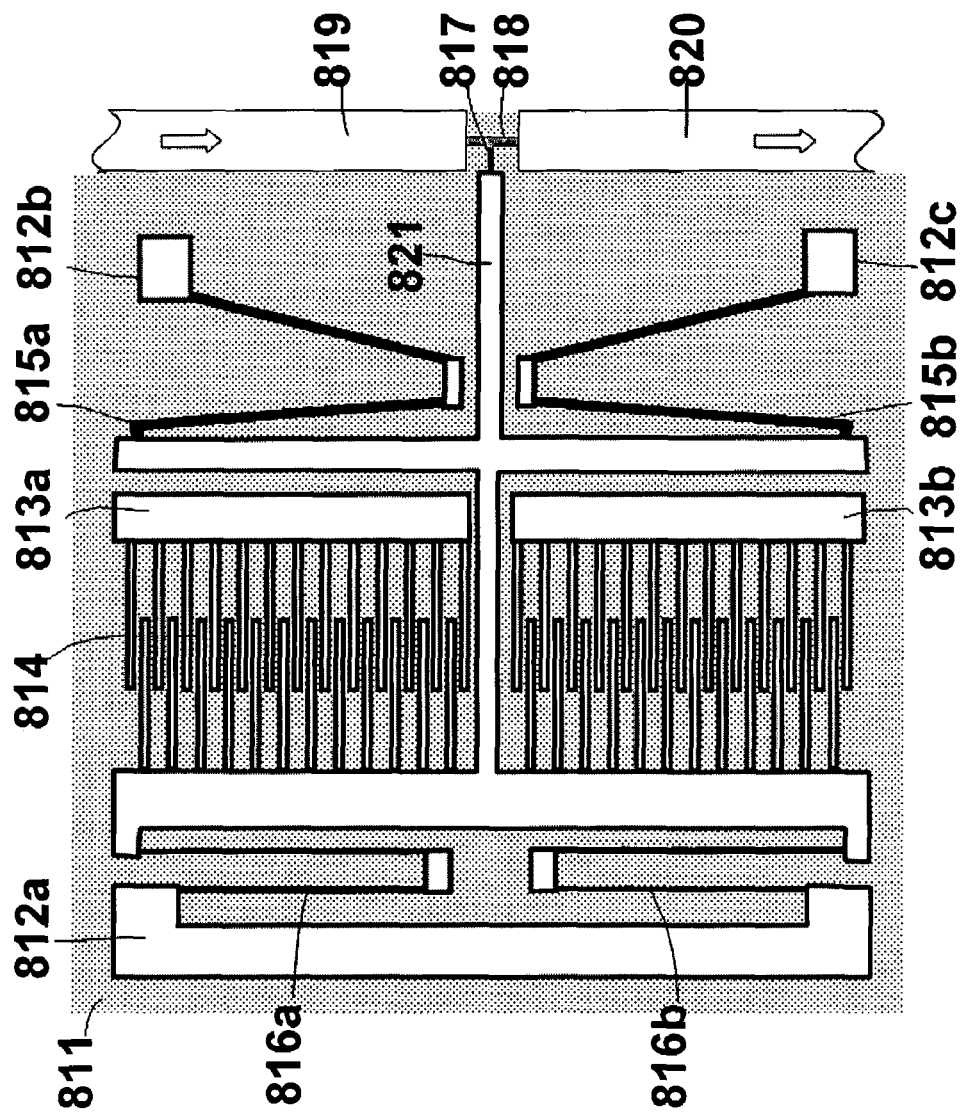
FIGS. 8a and 8b are the top views of the micro-optical device comprising comb drive actuator with asymmetric spring design that is normal folded-beam springs on one-side and compressive folded-beam springs on the other side; asymmetric spring design that is normal folded-beam springs with U-shaped-bridge joint on one-side and compressive folded-beam springs on the other side, respectively.

Additionally. the FIG. 8a discloses another kind of spring design of present invented device. We replace the design of suspended springs from the format of 615a, 615b, 615c and 615d in FIG. 6 to the format of 815a, 815b, 816a and 816b in FIG. 8a. All the structures and elements other than the asymmetric hybrid springs 815a, 815b, 816a and 816b of the micro-optical device 811 as shown in FIG. 8a represent identical functions as the structures and elements explained in FIG. 6. Again, the micro-optical device 811 comprises a reflective mirror 817 on one side of a shuttle beam 821, a set of stationary comb drive electrodes 813a and 813b, a set of movable comb electrodes 814, and four suspended asymmetric hybrid springs 815a, 815b, 816a and 816b. In particular, the compressive folded-beam springs 815a, 815b among the suspended asymmetric hybrid springs are connected with shuttle beam 821 and anchored onto the substrate via anchors 812b and 812c, while the rest part of the asymmetric hybrid springs 816a and 816b on the other side of device 811 are connected with shuttle beam 821 via a set of movable comb drive electrodes 814, and springs 816a and 816b are fixed onto the substrate via anchor 812a. The light signals from input optical fiber 819 transmit to reception optical fiber 820 so as to form a light oath 818. As we disclosed in previous paragraphs regarding to FIG. 6 and FIG. 7, the micro-optical device 811 can perform the gate switch and light attenuation functions in conjunction with light path arrangement as shown in FIG. 8a.

Figure 8B:
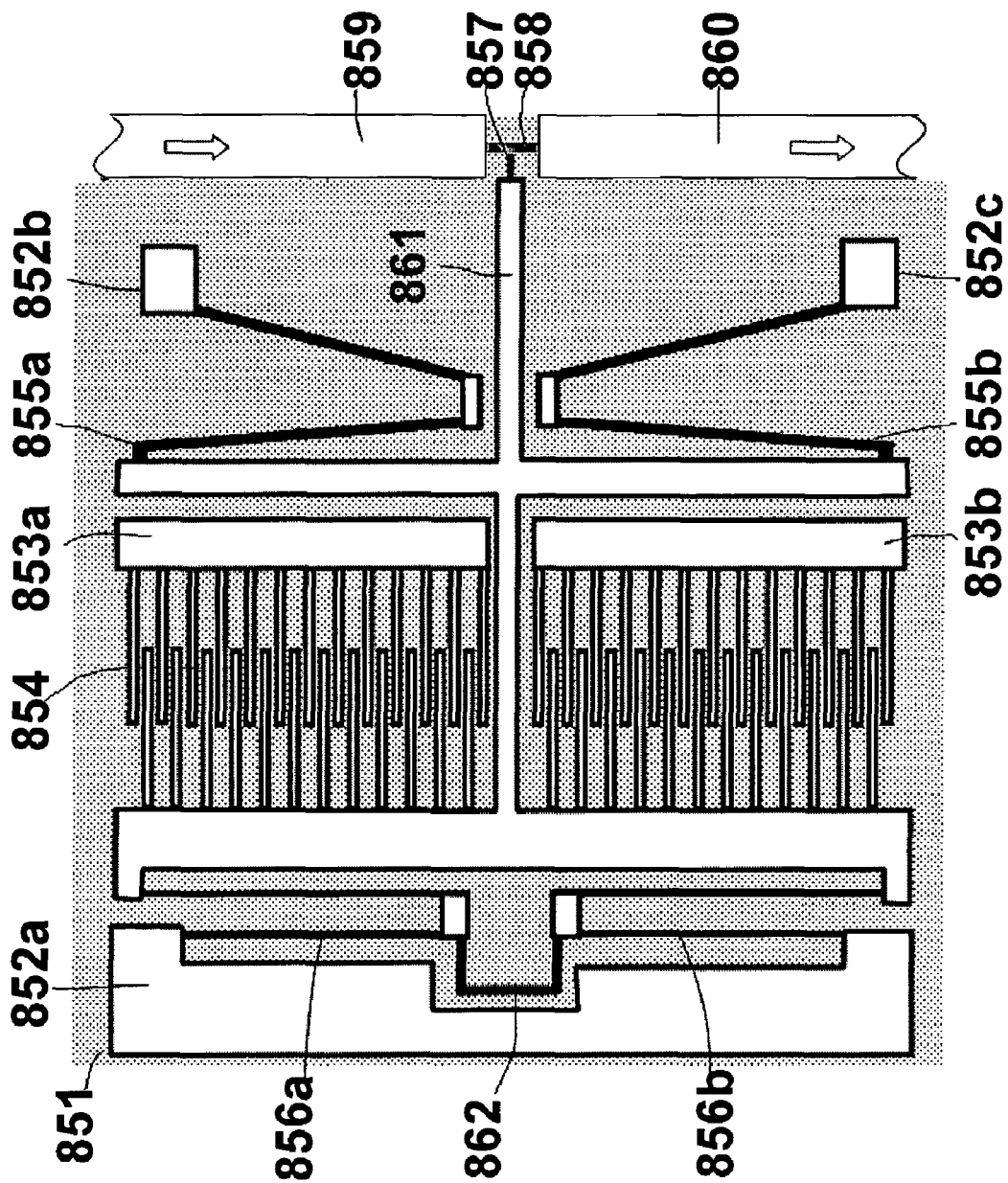
Figure 9:
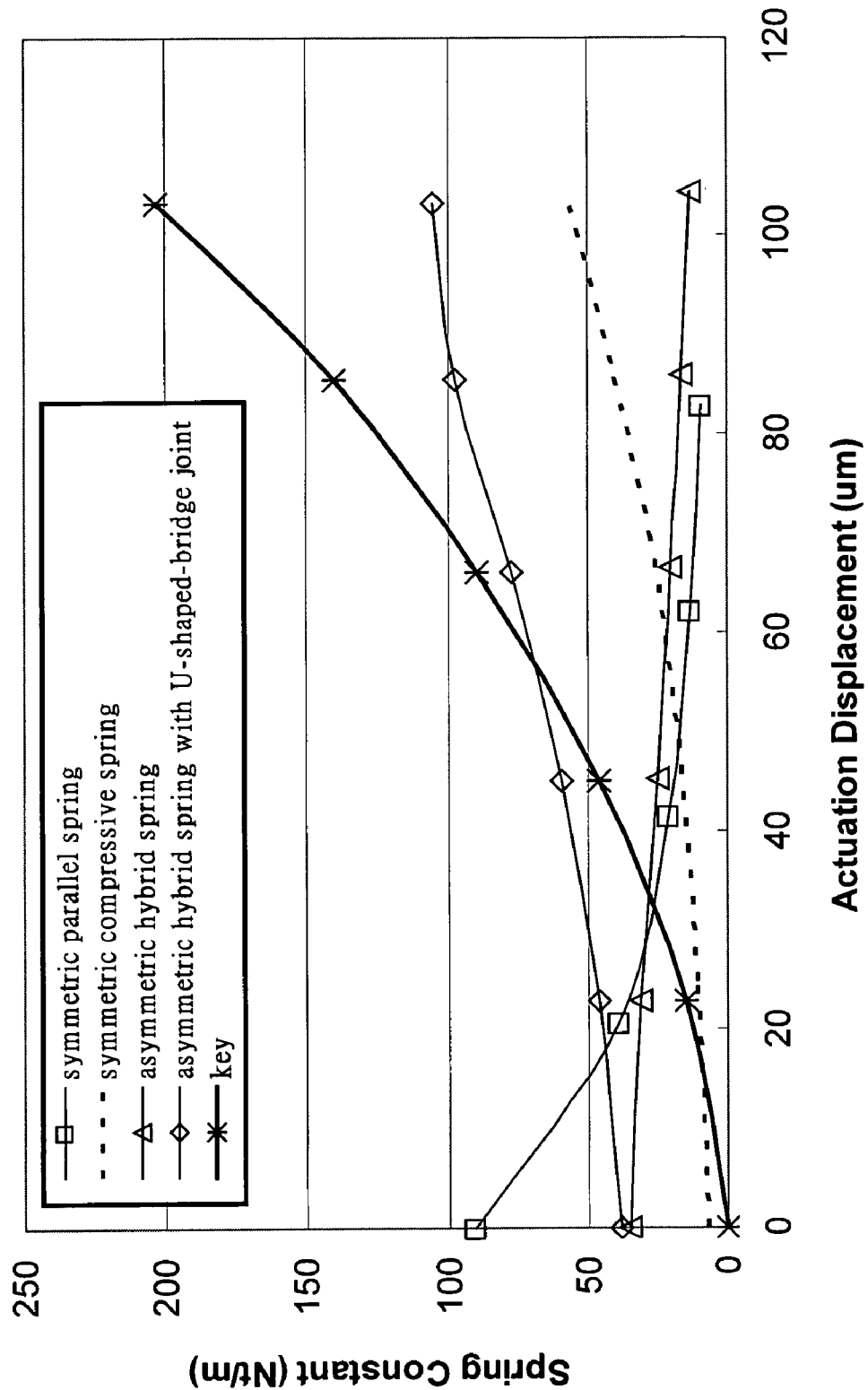
FIG. 9 shows the curves of spring constant $k_y$ along with the direction perpendicular to the moving direction of symmetric parallel spring, symmetric compressive spring, asymmetric hybrid spring, and asymmetric hybrid springs with U-shaped-bridge joint for comb drive actuator and stability criteria $k_{ey}$ versus various actuation displacement of comb drive actuator of the present invention.

Based on the analytical model, and FEM analysis results via ANSYS, we may derive the curves of $k_y$ and $k_{ey}$ versus the travel distance in x-direction, as shown in FIG. 9. It presents the $k_y$ of comb drive with symmetric parallel folded-beams spring decreased rapidly and the value of $k_y$ coincides with the $k_{ey}$ at 32 μm travel distance. Regarding to the comb drive with compressive folded-beams springs, in spite of that the $k_y$ of comb drive with a pair of compressive springs is increased as spring being compressed, the $k_y$ still coincide with the $k_{ey}$ at 18 μm displacement. Because the initial $k_y$ of this type comb is too small. To further enhance the lateral stiffness in y-direction of comb-drive with compressive beam spring design over initial actuation period, one pair of the compressive beam springs is replaced by a pair of normal folded-beam spring, and then this is denoted as a comb drive with asymmetric hybrid springs, as shown in FIG. 8a. Therefore the micro-optical device using this comb drive actuator comprises a pair of normal folded-beam spring 816a and 816b on one side, and a pair of compressive beam springs 815a and 815b on the other side. However, this third type comb drive actuator exhibits a decreased $k_y$ regarding to increment of x-directional displacement. To strengthen the lateral stiffness of this asymmetric spring comb again, we proposed an U-shaped-bridge joint 862 to connect the pair of parallel normal folded-beams springs to enable a new comb drive actuator based on asymmetric hybrid springs with U-shaped-bridge joint 862 comprises a pair of normal folded-beam spring 856a and 856b with an U-shaped-bridge joint 862 on one side, and a pair of compressive beam springs 855a and 855b on the other side, as shown in FIG. 8b.

In order to let the readers to have better understanding about another new design of springs of present disclosed micro-optical device, we hereby explain the notation of all the structures and elements shown in FIG. 8b. Although, there is only the design difference of suspended folded-beam springs, i.e., 855a, 855b, 856a, 856b and 862 among the device configuration as shown in FIG. 8b and device configurations discussed in FIG. 6, FIG. 7 and FIG. 8a. All the structures and elements other than the asymmetric hybrid springs 855a, 855b, and 856a and 856b with a U-shaped-bridge joint 862 of the micro-optical device 851 as shown in FIG. 8b represent the same functions as the structures and elements shown in FIG. 6, FIG. 7, and FIG. 8a, and discussed in related paragraphs. Basically, the micro-optical device 851 comprises a reflective mirror 857 on one side of a shuttle beam 861, a set of stationary comb drive electrodes 853a and 853b, a set of movable comb electrodes 854, and four suspended asymmetric hybrid springs 855a, 855b, and 856a and 856b with a U-shaped-bridge joint 862. In particular, the compressive folded-beam springs 855a, 855b among the suspended asymmetric hybrid springs are connected with shuttle beam 861 and anchored onto the substrate via anchors 852b and 852c, while the rest part of the asymmetric hybrid springs 856a and 856b on the other side of device 851 are connected with shuttle beam 861 via a set of movable comb drive electrodes 854. Additionally springs 856a and 856b are fixed onto the substrate via anchor 852a, and there is a U-shaped-bridge joint 862 to connect springs 856a and 856b as shown in FIG. 8b. The light signals from input optical fiber 859 transmit to reception optical fiber 860 so as to form a light path 858. As we disclosed in previous paragraphs regarding to FIG. 6, FIG. 7 and FIG. 8a, the micro-optical device 851 is able to perform the gate switch and light attenuation functions in conjunction with light path arrangement as shown in FIG. 8b.

As shown in FIG. 9, similarly, the initial $k_y$ of this type has been apparently promoted by such modification, the $k_y$ keeps increasing as the displacement increasing as the same trend observed in the case of four compressive folded-beam springs. As a result, the of the asymmetric comb drive actuator with U-shaped-bridge joint 862 meets with the $k_e$ at x-directional travel distance of 58 μm approximately. By using our innovative design, we are able to increase the maximum static displacement performance about 81% in this case.

These data point out a factor that our new asymmetric hybrid springs with U-shaped-bridge joint design will provide comb drive actuator with maximum stable displacement and corresponding maximum force output in moving direction than the normal folded-beams design. Part of this invention is going to be disclosed in the coming conference Eurosensors XVII, 17$^{th}$ European Conf. On Solid-State Transducers, Guimarães, Portugal, Sep. 21–24, 2003 in the title of "Development of Comb Drive with New Compressive Suspension Spring for Large Static Displacement and Continuous Motion Applications," by Chihchung Chen, Chengkuo Lee.

More importantly, we can simply deploy the technology disclosed in the first embodiment regarding to FIG. 3 and FIG. 4 to prepare micro-optical devices of 711, 811, and 851 with thinned springs with respect to comb drive electrodes in the perpendicular direction to substrate. Thereafter the spring stiffness is further increased in the planar direction along with the direction perpendicular to moving direction of shuttle beam.

Based on the detailed description of our invention, the micro-optical device based on the layout and design using said aforementioned approach to make the micro-mirror can perform large displacement to fulfill diversified requirements regarding to broaden applications.

The Third Embodiment

Figure 10A:
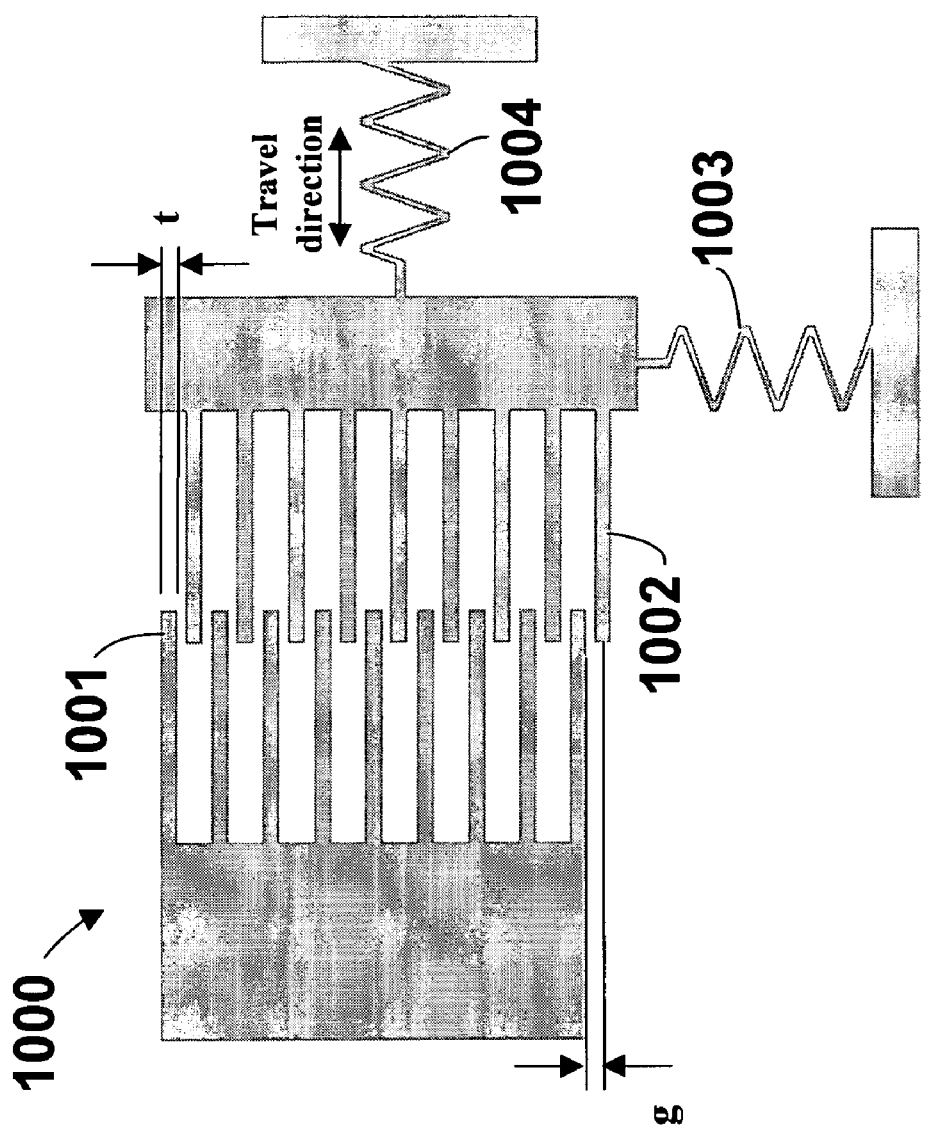
FIGS. 10a and 10b are the simplified top views of finger electrode shape drawing of conventional comb drive actuator, and finger electrode shape with oblique-angle shape of the present invention.
Figure 10B:
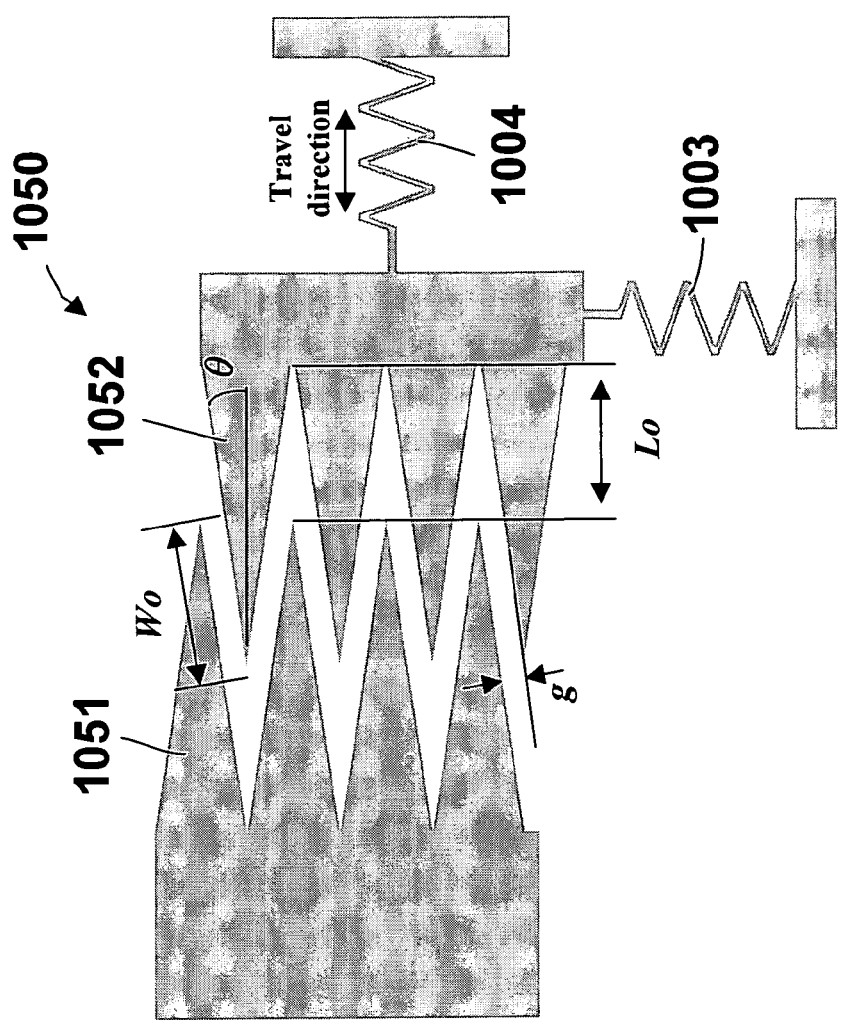

In according to the other aspect of our invention, we proposed micro-optical devices using comb drive actuator 1050 based on a stationary comb finger electrode of a shape with oblique angle 1051, and a movable comb finger electrode of a shape with oblique angle 1052, as shown in FIG. 10b. Thereby the force output from said comb drive actuator is enlarged based on this approach. Basically the generated electrostatic force from the comb drive actuator is contributed by the electrostatic field between the two comb finger electrodes.

The displacement of the movable comb finger electrode 1052 from its original rest position is a result of force balance between the electrostatic force and spring restoration forces along with the travel direction and perpendicular direction of travel direction. i.e., denoted as spring force 1004 and spring force 1003. The spring design mentioned in present embodiment is one of our inventions disclosed in embodiments 1 and 2.

Comparing to the electrode shape of conventional comb finger 1001 and 1002 as shown in FIG. 10a, the major field line is aligned much closed to the moving locus, which means better energy coupling efficiency can be obtained. Therefore, under the same input voltage, the force generated by comb drive of oblique shape comb finger electrode (1050) is larger than the conventional comb drive actuator 1000. The relative experimental results have been disclosed by the following literatures, see for example, M. A. Rosa, S. Dimitrijev, and H. B. Harrison, "Enhanced electronic force generation capability of angled comb finger design used in electrostatic comb-drive actuators," Electronics Letters, 1998, Vol. 34, No. 18, pp. 1787~1788; J. Hsieh, C.-C. Chu, and W. Fang, "On the driving mechanism design for large amplitude electrostatic actuation," Proceedings of 2001 ASME International Mechanical Engineering Congress and Exposition, paper number of IMECE2001/MEMS-23804, Nov. 11~16, 2001, New York, USA. These publications have proven the basic idea regarding to comb drive of oblique shape comb finger electrode. To the best knowledge of inventors', there is no published works regarding to the micro-optical devices using comb drive actuator with comb finger electrode of oblique shape. Thereby micro-optical devices using this new comb drive actuator are suitable for device designs and applications need large actuation force. In conjunction with spring with higher stiffness, the micro-optical devices using this new comb drive actuator can generate larger actuation force against to the spring force ad side instability effect, thereby reaching larger x-directional displacement.

The Fourth Embodiment

Referring to the common configuration of most reported VOA device, there is a micro-shutter located in between the spacing of transmission and reception fibers, and the light propagation path is along with the same axis of these two fiber; i.e., the axial type configuration. The light is attenuated in terms of the percentage of transmission light beam being blocked by shutter with respect to position of shutter, where the position of shutter is electrically controlled by microactuators. To get the insertion loss as small as possible, the spacing between two fiber ends is arranged as small as possible. Nevertheless, the back-return loss is hard to be diminished to less than −50 dB, using a micro-mirror to reflect a portion of input optical signals and making the reflected portion of input optical signals to be coupled into output ports is a good way to reduce the back-return loss with respect to the back-reflected light from micro-mirror to input port. Based on using this reflective micro-mirror to perform the light attenuation task, there is one approach that is adopting a flat reflective micro-mirror and out-of-plane light path configuration, (See for example, K. C. Robinson, U.S. Pat. No. 6,137,941, "Variable Optical Attenuator,"; and K. Isamoto, K. Kato, A. Morosawa, C. Chong, H. Fujita, and H. Toshiyoshi, "Micromechanical VOA design for high shock-tolerance and low temperature-dependence," To be published in Proc. of 2003 IEEE/LEOS International Conf. on Optical MEMS 2003, Hawaii, USA, Aug. 18–21, 2003.), and there is the other approach that is using a reflective micro-mirror with in-plane motion capability and in-plane light path configuration. This kind of in-plane light path approach based on using taper-ended fibers has been disclosed by C.-H. Kim, Namkyoo Park, and Y.-K. Kim, "MEMS Reflective Type Variable Optical Attenuator Using Off-Axis Misalignment," Proceedings of 2002 IEEE/LEOS International Conf. on Optical MEMS 2002, Lugano, Switzerland, Aug. 20–23, 2002, pp. 55–56. By using the taper-ended fibers as the input and output ports, approach of C.-H. Kim et al can make the reflective micro-mirror only need to move very short distance range, let say about several micrometers, due to the spacing between taper-ended fibers is very small. However, the result regarding to optical performance reported by them is not very promising, insertion loss is around 1.8 dB which is larger than the normal acceptable value, i.e., less than 1 dB, for practical use purpose. At the same time, one of present inventor has presented our invented VOA device based on reflective micro-mirror with in-plane motion capability and in-plane light path configuration approach. (Chengkuo Lee "Challenges in Optical MEMS Commercialization and MEMS Foundry", Presentation materials of invited talk in 2002 IEEE/LEOS International Conf. on Optical MEMS 2002, Lugano, Switzerland, Aug. 20–23, 2002) In our approach, we use the lens fibers or collimators to get larger collimated light beam size, and thereby, the general optical performance of VOA becomes better. But the trade-off is that the micro-mirror actuation distance has to be enlarged in order to fully reflect the incoming light with respect to the beam size. By using the comb drive actuator with said springs disclosed in this invention, we are able to fulfill the need of enlarged micro-mirror actuation distance when we use said reflective micro-mirror and in-plane light path design approach.

Additionally, by integrated multiple reflective mirrors with multiple output ports, the incoming optical signals from one signal port can be reflected and coupled into a specified channel among said output ports. This design is an approach to 1×N optical switch device that was disclosed by J. H. Jerman, J. D. Grade, and J. D. Drake, U.S. Pat. No. 5,993,906, "Electrostatic microactuator and method for use thereof," Dec. 7, 1999.

Obviously, using the ideas disclosed in former embodiments, our invented micro-optical devices using electrostatically operated comb drive actuator with enlarged displacement and enlarged force output in conjunction with said reflective micro-mirror and in-plane light path scheme is very promising in said VOA and optical switch applications practically. Some updated result regarding to our invented device can be referred to the following publications. (Chihchung Chen, Chengkuo Lee, Yenjyh Lai, and Wen-Chih Chen, "Development and Application of Lateral Comb-drive Actuator," Jpn. J. Appl. Phys. Vol. 42, Part. 1, No. 6B, 2003, pp. 4059–4062; Chihchung Chen, Chengkuo Lee, and Yenjyh Lai "Novel VOA Using In-Plane Reflective Micromirror and Off-Axis Light Attenuation", IEEE Communications Mag., the quarterly supplement IEEE Optical Communications, pp. S16–S20, August 2003.) In according to the other aspect of our invention, we proposed micro-optical devices as shown in FIG. 11a, the micro-mirror 1111 of said micro-optical device are located and aligned in a geometric layout configuration where the input light beam from the transmission fiber 1114 of input channels reflected by said micro-mirror 1111 toward the reception fiber 1115 of the output channels; thereby the input optical signals according to light path 1112 from the input fiber 1114 is reflected by said micro-mirror 1111 regarding to spatial position at micro-mirror position 1111a toward the reception fiber 1115 according to a light path 1113a, then all the incoming light has been reflected and coupled into the reception fiber 1115. Besides, the input optical signals according to light path 1112 from the input fiber 1114 is reflected by said micro-mirror 1111 regarding to spatial position at micro-mirror position 1111b toward the reception fiber 1115 according to a light path 1113b, then a portion of the incoming light has been reflected and has not been coupled into the reception fiber 1115, thereafter the uncoupled portion of incoming light is attenuated without back-reflected into the input fiber 1114. By using fiber optics with larger collimated light beam size and actuator with larger displacement, we can reach better optical performance for said micro-optical devices according to present disclosed approach.

Figure 11B:
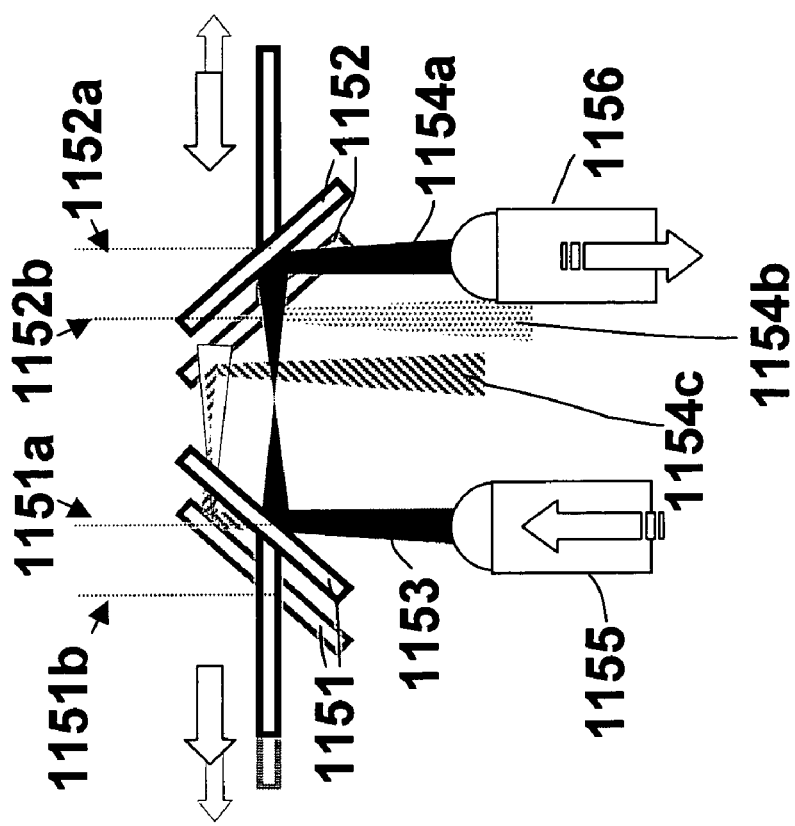
FIG. 11b is a multiple reflected light path for variable optical attenuation and optical switching applications realized by using a plurality of said reflective micro-mirrors of the present invention.
Figure 11A:
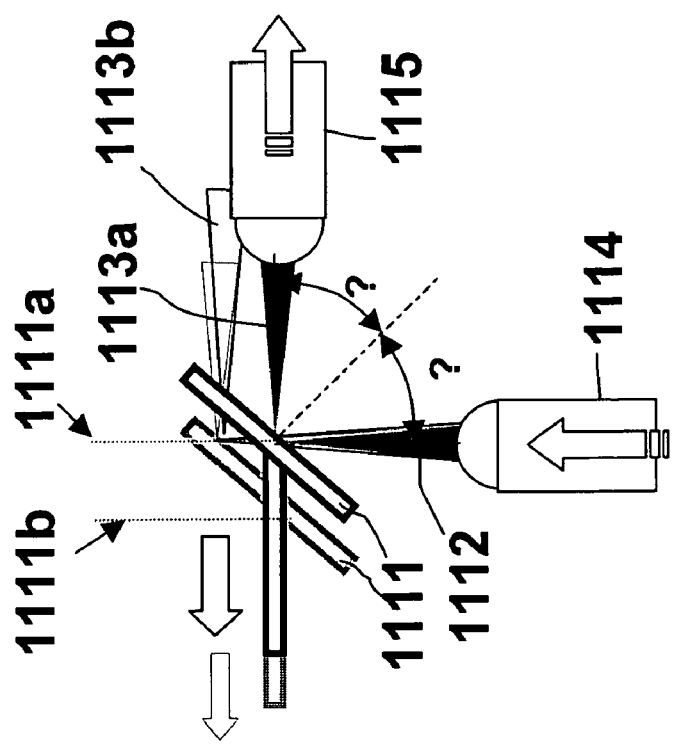
FIG. 11a shows the light path based on using reflective movable micro-mirror to change the transmission path with respect to reflected light signals.

On the other hand, regarding to the micro-optical devices as shown in FIG. 11b, we may integrated or assembled a plurality of reflective micro-mirror together with multiple input and output channels in a device configuration that the micro-mirrors 1151 and 1152 of said micro-optical device are located and aligned in a geometric layout configuration where the input light beam from the transmission fiber 1155 of one of input channels reflected by said micro-mirror 1151 toward another reflective micro-mirror 1152 then being reflected again and transmitted forward to the reception fiber 1156 of the output channels; thereby the input optical signals according to light path 1153 from the input fiber 1155 is reflected by multiple micro-mirrors 1151, 1152, etc. regarding to various spatial position at micro-mirror position 1151a, b and 1152a, b toward the reception fiber 1166 of the output channels. As a result, by maintaining the micro-mirror 1151 at mirror position 1151a, we may adjust the mirror position regarding to another micro-mirror 1152 from 1154a position to 1154b position. Moreover, our approach may have broaden adjustable range of light path, say from 1153 input light path to 1154a, 1154b, and 1154c output light path, by using more than one movable reflective micro-mirrors to change the reflected light path. By doing so, we may apply said micro-optical devices for optical switching and variable optical attenuation applications in multiple channels manner, while the good optical performance can be achieved based on our proposed new comb drive actuator designs.

More importantly. said micro-optical devices discussed in present embodiment are the devices comprise comb drive actuators to drive the mirrors 1111, 1151 and 1152 to change their locations regarding to various light path configurations, where these comb drive actuators deploy the springs using the designs of said springs disclosed in previous embodiments. Besides, the comb drive actuator 1050 with finger electrodes of oblique angle shape as disclosed in the third embodiment can be applied to provide the necessary force to move said mirrors 1111, 1151 and 1152 in present embodiment, thereby the required driving voltage is reduced.

Part of this invention has been disclosed in the literatures of: Interactive multimedia materials shown in: Chihchung Chen, Chengkuo Lee, and Yen-jyh Lai "Novel VOA Using In-Plane Reflective Micromirror and Off-Axis Light Attenuation", IEEE Communications Mag., the quarterly supplement IEEE Optical Communications, pp. S16–S20, August 2003, [http://www.comsoc.org/ci1/Public/2003/aug/index.html].

The Fifth Embodiment

In according to another aspect of our invention, the micro-optical device is desirable to have a mechanism to hold said micro-mirror in specified spatial location and position with respect to optical paths without electrical power consumption. As disclosed by M. Lim, R. Fan, and L. Que, U.S. Pat. No. 6,549,107, "Latching mechanism for MEMS actuator and method of fabrication," Apr. 15, 2003, movable arms can enter the spacing of stoppers of shuttle beam with shaped stoppers to hold the shuttle beam at various positions without electrical power consumption. Unlike the aforementioned buckle beam latch mechanism behaving bi-stable motion, this approach can maintain the shuttle beam at as many as positions equivalent to the number of spacing between two shaped stoppers among whole group of shaped stoppers along with the shuttle beam, thereby achieving digitally control of shuttle beam positions.

Regarding to our invention, we propose a new latch, i.e., a clip type latch, mechanism for said micro-optical devices in an analog controllable manner. As shown in shown in FIG. 12-*a*, a clip type latch mechanism comprises a grip structure 1202 formed on a substrate of said micro-optical device to clamp said shuttle beam 1206 via the friction force forming at the contact interface of the clamped location between grip structure 1202 and shuttle beam 1206; thereby said micro-optical device can maintain its status at states with respect to various micro-mirror 1207 positions and locations in an analog controllable manner without electrical power consumption when said clip type latch is used to clamp said shuttle beam 1206. The grip structure 1202 can be moved by various micro-actuators 1203. To move and control the micro-mirror 1207 to the desired position is done by the the force balance between the electrostatic force from the comb drive actuators 1201 and suspended springs 1204 of said micro-optical device, where these suspended spring 1204 are fixed onto substrate via anchors 1205. The suspended springs 1204 are said springs of our inventions disclosed in previous embodiments. Besides, the comb drive actuators 1201 can further deploy our advanced design of comb drive actuator 1050 with finger electrodes of oblique angle shape as disclosed in the third embodiment so as to reduce the required driving voltage. When the micro-mirror 1207 is moved to said desired position already, we can apply the grip structure 1202 to clamp the shuttle beam 1206. Thereafter, without continuously applying electrical load to said micro-optical device, we may hold said micro-mirror 1207 at desired position with electrical power consumption. As shown in FIG. 12*b*, the control of grip structure 1252 can also be realized by a micro-actuator 1253, instead of two micro-actuators 1203 for individually controlling the grip structure 1202 shown in FIG. 12*a*.

As shown in FIG. 12*b*, the location of micro-mirror 1207 is controlled by the force balance between the electrostatic force from the comb drive actuators 1251 and suspended springs 1254 of said micro-optical device, where these suspended spring 1254 are fixed onto substrate via anchors 1255. The suspended springs 1254 are said springs of our inventions disclosed in previous embodiments. Additionally, the comb drive actuators 1251 can further deploy our advanced design of comb drive actuator 1050 with finger electrodes of oblique angle shape as disclosed in the third embodiment so as to reduce the required driving voltage. Again, when the micro-mirror 1257 is moved to said desired position, then we apply the grip structure 1252 to clamp the shuffle beam 1256. Without continuously applying electrical load to said micro-optical device, we hold said micro-mirror 1257 at a particular position with electrical cower consumption.

Figure 12A:
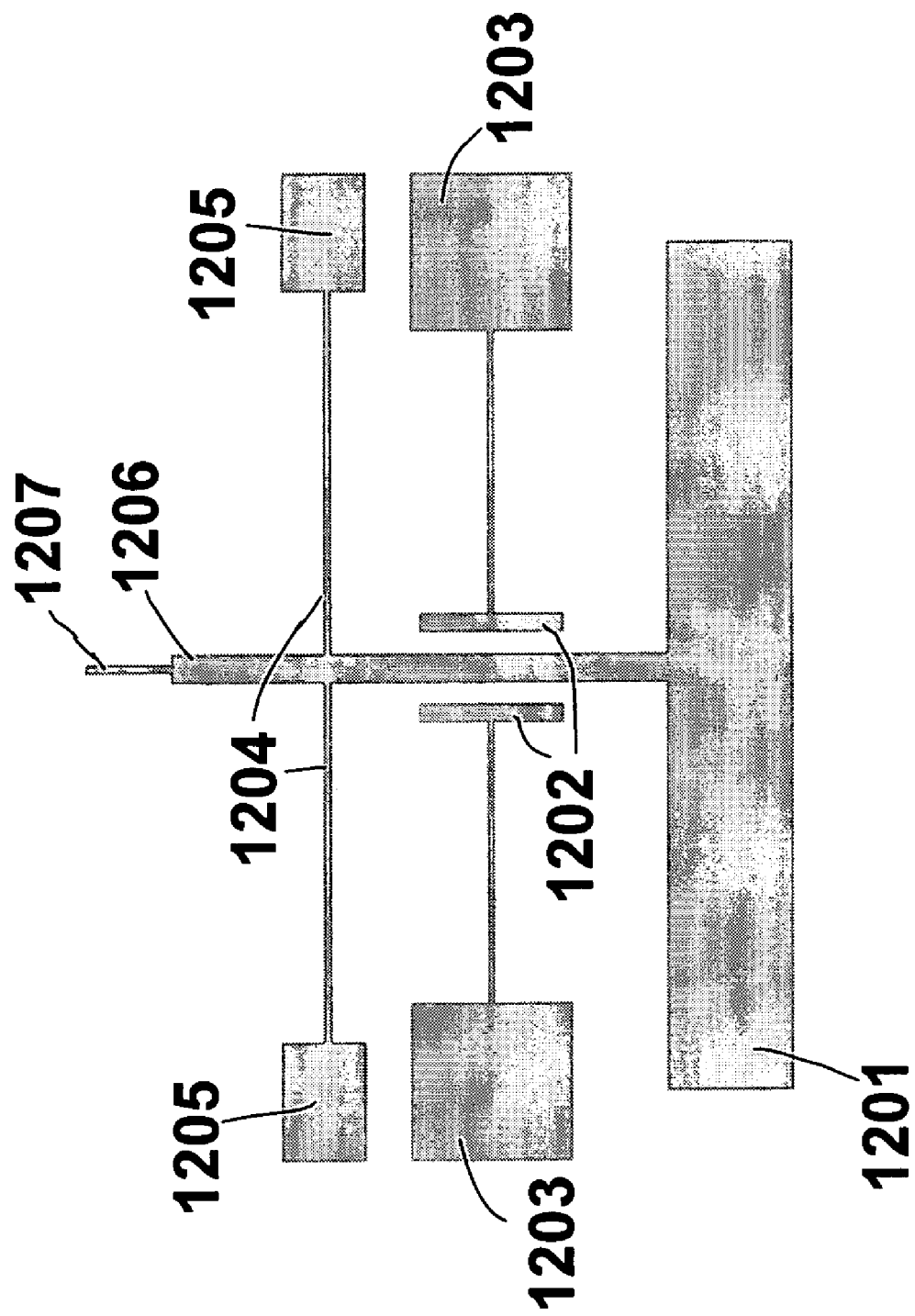
FIGS. 12a and b are simplified top views of a clip type latch based on using friction force and/or electrostatic force to clamp the movable structure for present invention disclosed micro-optical devices disclosed in the present invention.
Figure 12B:
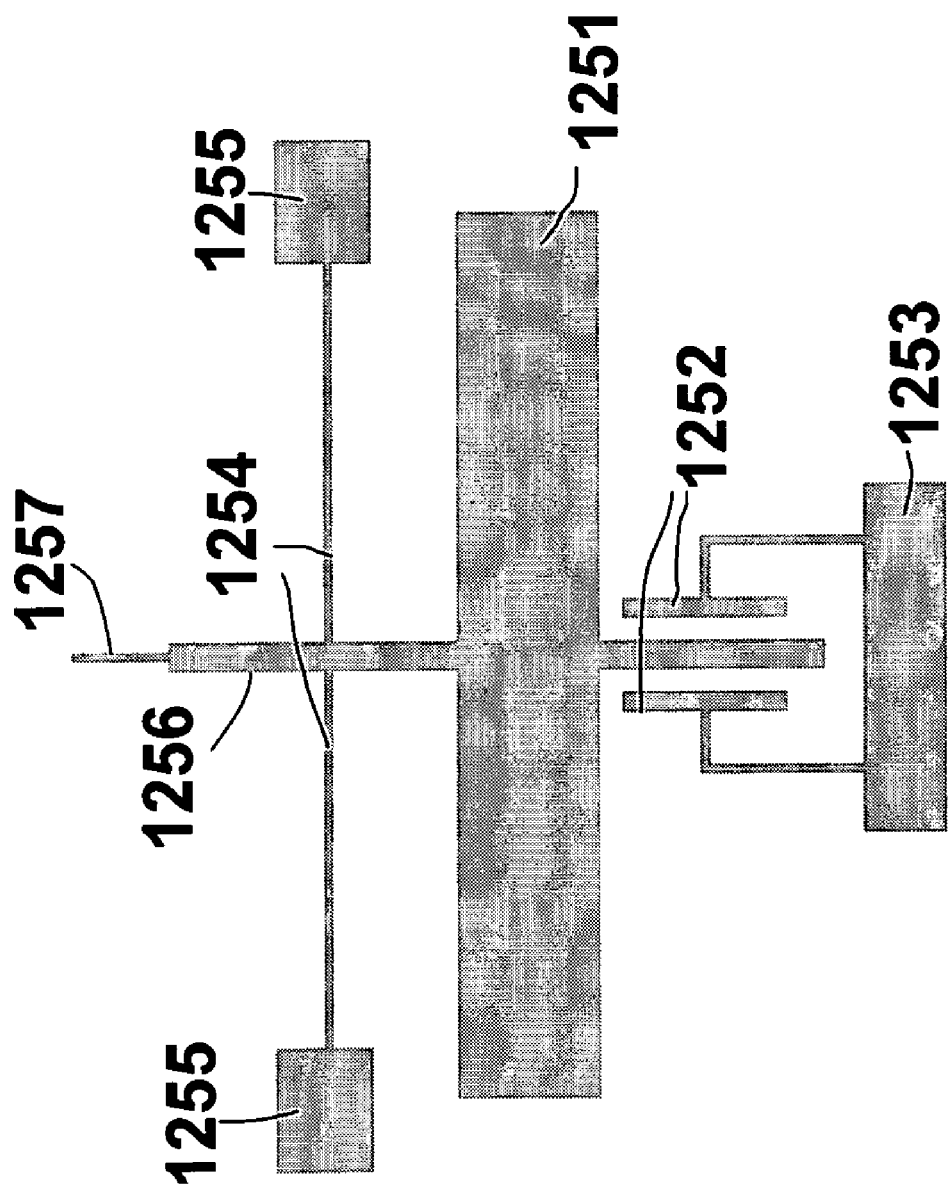

Additionally, if we separate two sides of the grip structure 1202 in FIG. 12*a* or 1252 in FIG. 12*b* into two electrical electrodes with a voltage difference, and there is insulation coating on the contacting surface of 1202 and 1252, then the grip arms from two sides of grip structure can move close to each other due to the electrostatic force, and shuttle beam 1206 in FIG. 12*a* or 1256 in FIG. 12*b* will be clamped by these two grip arms 1202 in FIG. 12*a* or 1252 in FIG. 12*b*, respectively, due to said electrostatic force. Briefly speaking, clip type latches by using friction force or electrostatic force are invented for said micro-optical devices to maintain the status of said micro-optical devices at certain condition without power consumption in an analog control manner.

The Sixth Embodiment

According to the present invention, many ways can be provided to make the mill or surface smoothness of said micro-optical devices in a mass production manner with higher production yield. Basically the following approaches have been reported to exhibit the result to make a silicon side wall surface the same as the facet planes regarding to single crystal silicon, such as, applying the silicon etching solution, such as the KOH or TMAH solution to reduce the surface roughness, and adopting the (110) oriented silicon substrate in conjunction with post-etching in the silicon etching solution. (See for example, M. Sasaki, T. Fujii, Y. Li, and K. Hane, "Anisotropic Si Etching Technique for Optically Smooth Surface," IEEE Proceedings of Transducers'01, the 11$^{th}$ international conference on solid-state sensors and actuators, Munich, Germany, Jun. 10–14, 2001.) Besides, we can also oxidize the mirror surface after the mirror sidewall is formed by DRIE, then certain level of surface corrugated silicon microstructures will become SiO2. After removing the SiO2, we can have very smooth silicon mirror with optical level of quality. We had applied these kinds of approaches to make micro-mirror of said micro-optical devices become very smooth. Part of the relative results have been published by Chihchung Chen, Chengkuo Lee, and Yen-jyh Lai "Novel VOA Using In-Plane Reflective Micromirror and Off-Axis Light Attenuation", IEEE Communications Mag., the quarterly supplement IEEE Optical Communications, pp. S16–S20, August 2003.

According to the other aspect of present invention, we also apply many ways call be provided to make the packaging process of said micro-optical devices in a mass production maimer with higher production yield, such as using the lid capping on the substrate to protect the fragile MEMS elements; making flow channels and trenches on the substrate to avoid the movable and suspended MEMS elements being attacked by the sealing and assembling materials like glues, epoxy, solders, etc; and dicing the devices form substrates, then became discrete dies when the MEMS elements have been protected by lids.

While the description above provides a full and complete disclosure of the preferred embodiments of the present invention, various modifications, alternatives, and equivalents will be obvious to those of skill in the art. Accordingly, the scope of the invention is limited solely by the following claims.

What is claimed is:

1. A micro-optical device comprising:
   a reflective movable micro-mirror connected with comb finger electrodes and springs via a shuttle beam;
   a set of suspended springs connected with said shuttle beam and with one end anchored onto a substrate;
   a comb drive actuator consists a set of movable comb finger electrodes suspended on a substrate and connected with said shuttle beam, and a set of stationary comb finger electrodes anchored on said substrate; and
   the shuttle beam being movable with respect to the stationary portion of said substrate in response to operation of said comb drive actuator, thereby said micro-mirror is moved by said shuttle beam, wherein the set of suspended springs has a thickness that is less than a thickness of each of the set of movable comb finger electrodes and the set of stationary comb finger electrodes in a perpendicular out-of-plane direction to said substrate of the device.

2. The micro-optical device as claimed in claim 1, wherein the micro-mirror of said micro-optical device stays in an initial position without external electrical load, thereby incoming optical signals from one channel of input ports transmit toward reception optical fiber of one channel of output ports; the set of movable comb drive electrodes which are connected with a movable shuttle beam move toward the stationary comb drive electrodes due to electrostatic force between said two sets of comb drive electrodes when an electrical load is applied to the comb drive actuator, the micro-mirror connected with said shuttle beam move to the second stable position and stays at this position, thereby the incoming optical signals from one channel of the input ports transmit toward said micro-mirror, then said incoming optical signals being reflected toward the reception optical fiber of another channel of the output ports;
   therefore the input optical signals can transmit forward from one channel of input ports to an initial output channel when said micro-optical device maintains at its initial state without external applied electrical load, and when said micro-optical device under operation with external applied electrical load, said micro-optical device can switch said optical signals from one channel of input ports to a specified channel of output ports other than the initial output channel.

3. The micro-optical device as claimed in claim 1, wherein the micro-mirror of said micro-optical device stays in an initial position without external applied electrical load, thereby incoming optical signals from one channel of input ports transmit forward said micro-mirror, and being reflected toward a reception optical fiber of one channel of output ports; and, the set of movable comb drive electrodes which are connected with a movable shuttle beam move toward the stationary comb drive electrodes due to an electrostatic force between said two sets of comb drive electrodes when an electrical load is applied to the comb drive actuator, the micro-mirror connected with said shuttle beam move to the second stable position and stays at this position, thereby the incoming optical signals from one channel of the input ports transmit toward the reception optical fiber of one channel of the output ports without incident onto said micro-mirror;
   thus said micro-optical device can make said incoming optical signals from one channel of input ports be reflected by said micro-mirror toward a specified channel of output ports when said micro-optical device maintains at its initial state without external applied electrical load; and the input optical signals can transmit from one channel of input ports toward one channel of output ports due to these optical signals being reflected by said micro-mirror when said micro-mirror has been moved by comb drive actuator to the second stable position.

4. The micro-optical device as claimed in claim 1, wherein a fiber of an input channel and a fiber of an output channel are located and aligned along with a light beam transmission axis, and the micro-mirror of said micro-optical device is located in the spacing between the fiber end of input channel and the fiber end of the output channel, and the light intensity of optical signals in transmission is controlled and attenuated in terms of blocking a portion of a transmitted light beam, where the operation of blocking a portion of the transmitted light beam and thereby an attenuation range is determined by the position of said micro-mirror regarding to the actuation of said movable comb drive under external electrical load.

5. The micro-optical device as claimed in claim 1, wherein a fiber of an input channel, a fiber of an output channel, and the micro-mirror of said micro-optical device are located and aligned in a geometric layout configuration where an input light beam from the fiber of input channel reflected by said micro-mirror toward a reception fiber of the output channel; thereby all the input optical signals from the input fiber reflected by said micro-mirror toward the output fiber at the initial state of said optical device, and an attenuation range is determined by the position of said micro-mirror regarding to the actuation of said movable comb drive under external electrical load.

6. The micro-optical device as claimed in claim 1, wherein a fiber of an input channel, a fiber of an output channel, and the micro-mirror of said micro-optical device are arranged and aligned in a geometric layout configuration where a light intensity of input optical signals from an input fiber are not coupled into an output fiber at the initial state of said optical device, and a portion of the input light intensity start to be coupled into the output fiber due to said micro-mirror moving to the corresponding position where said portion of an input light beam is reflected by said micro-mirror toward the output fiber, when the comb drive is actuated to move said micro-mirror under external electrical load; thereby an attenuation range is determined in terms of said micro-mirror position.

7. The micro-optical device as claimed in claim 1, wherein a multiple input channels of fiber optics, multiple input channels of fiber optics, and a plurality of reflective micro-mirror of said micro-optical device are located and aligned in a geometric layout configuration where an input light beam from one of the multiple input channels of fiber optics reflected more than one time by said reflective micro-mirror then transmitted toward one of the multiple output channels of fiber optics; thereby all the input optical signals being reflected more than one time by said micro-mirror toward the output channels; wherein the fiber optics comprise the optics integrated and assembled with the fibers and waveguides to achieve desired collimated light beam.

8. The micro-optical device as claimed in claim 1, wherein the set of springs consists four symmetric allocated folded-beam springs that these springs comprise at least one pair of compressive structures located on one side of said device regarding to center of device; and the spring constant along with the perpendicular in-plane direction to the moving direction of said set of springs is increasing as the moving displacement increased; therefore said micro-optical device is more robust to the side instability of finger electrodes in longer actuation displacement.

9. The micro-optical device as claimed in claim 1, wherein said set of springs consists a pair of normal folded-beam springs with U-shaped-bridge joint, and a pair of compressive folded-beam springs located in a symmetric manner; and the spring constant along with the perpendicular in-plane direction to the moving direction of said set of springs is increasing as the moving displacement increased; therefore the micro-optical device is more robust to the side instability of finger electrodes.

10. The micro-optical device as claimed in claim 1, wherein the finger electrode shape of said comb drive actuator of said micro-optical device is a kind of shape with an oblique angle thereby the generated force output from said comb drive actuator is enlarged for device designs and applications need large actuation force.

11. The micro-optical device as claimed in claim 1, wherein a clip type latch mechanism comprises a grip structure formed on the substrate of said micro-optical device to clamp said shuttle beam via the friction force formed at the contact interface of the clamped location between grip structure and shuttle beam; thereby said micro-optical device can maintain its status at certain state without electrical power consumption when said clip type latch is used to clamp said shuttle beam.

12. The micro-optical device as claimed in claim 1, wherein the mirror surface of said micro-mirror of said micro-optical device is smoothed by applying the silicon etching solution to reduce the surface roughness that is formed during said DRIE process for making the micro-mirror sidewall from said silicon substrate.

13. The micro-optical device as claimed in claim 1, wherein the mirror surface of said micro-mirror of said micro-optical device is smoothed by adopting the (110) oriented silicon substrate as the initial substrate in conjunction with a post DRIE wet etching step in the silicon etching solution, thereby a silicon sidewall of smooth (110) facet is formed to be the mirror surface and the surface roughness of the just DRIE etched mirror is reduced.

14. The micro-optical device as claimed in claim 1, wherein the mirror surface of said micro-mirror of said micro-optical device is smoothed by a post DRIE oxidation step of the DRIE etched micro-mirror structure of said micro-optical device, thereby a silicon sidewall of smooth surface is formed.

15. The micro-optical device as claimed in claim 1, wherein the device substrate of said micro-optical device is covered and sealed by a lid to protect the fragile MEMS elements including the micro-mirrors, comb drive electrodes, suspended springs, micro-optics, and MEMS actuators.

16. The micro-optical device as claimed in claim 1, wherein flow channels and trenches are formed on said substrate of said micro-optical device to let fluidic materials and melted metals flow through inside said channels and trenches during the alignment, assembly, sealing, and packaging process; thereby the fragile MEMS elements will avoid damage caused by said fluidic materials.

17. A micro-optical device comprising:
a reflective movable micro-mirror connected with comb finger electrodes and springs via a shuttle beam;
a set of suspended springs comprising at least one pair of compressive structure, one end of said springs is connected with said shuttle beam and the other end of said springs is anchored onto a substrate;
a comb drive actuator consists a set of movable comb finger electrodes suspended on a substrate and connected with said shuttle beam, and a set of stationary comb finger electrodes anchored on a substrate;
a shuttle beam movable with respect to the stationary portion of said substrate in response to operation of said comb drive actuator, thereby said micro-mirror is moved by this said shuttle beam;
a clip type latch mechanism comprises a grip structure formed on the substrate of said micro-optical device to clamp said shuttle beam, wherein the grip structure formed on the substrate of said micro-optical device to clamp said shuttle beam is via the friction force forming at the contact interface of the clamped location between grip structure and shuttle beam; thereby said micro-optical device maintains its status at certain states in an analog controllable manner without electrical power consumption when said clip type latch is used to clamp said shuttle beam; and
a portion of said springs is thinner than the rest portion of microelectromechanical structures of said elements on the perpendicular out-of-plane direction to said substrate regarding to said device.

18. A micro-optical device comprising:
a reflective movable micro-mirror connected with comb finger electrodes and springs via a shuttle beam;
a set of suspended springs comprising at least one pair of compressive structure, one end of said springs is connected with said shuttle beam and the other end of said springs is anchored onto a substrate;
a comb drive actuator consists a set of movable comb finger electrodes suspended on a substrate and connected with said shuttle beam, and a set of stationary comb finger electrodes anchored on a substrate;
a shuttle beam movable with respect to the stationary portion of said substrate in response to operation of said comb drive actuator, thereby said micro-mirror is moved by this said shuttle beam;
a clip type latch mechanism comprises a grip structure formed on the substrate of said micro-optical device to damn said shuttle beam, wherein the grip structure formed on the substrate of said micro-optical device to clamp said shuttle beam is via the electrostatic force forming between the gap between two side electrodes of grip structure when the two electrodes attract to each other, and come to contact with shuttle beam, where the electrodes of grip arm are coated with insulating materials and isolated from the shuttle beam; thereby said micro-optical device maintains its status at certain states in an analog controllable manner without electrical power consumption when said clip type latch is used to clamp said shuttle beam.

* * * * *